United States Patent
Brown et al.

(10) Patent No.: US 8,927,068 B2
(45) Date of Patent: Jan. 6, 2015

(54) METHODS TO FABRICATE VARIATIONS IN POROSITY OF LITHIUM ION BATTERY ELECTRODE FILMS

(75) Inventors: Karl M. Brown, Santa Clara, CA (US); Hooman Bolandi, San Jose, CA (US); Victor Pebenito, San Jose, CA (US); Josef Thomas Hoog, Novato, CA (US); Connie P. Wang, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 51 days.

(21) Appl. No.: 13/532,616

(22) Filed: Jun. 25, 2012

(65) Prior Publication Data
US 2013/0017340 A1  Jan. 17, 2013

Related U.S. Application Data

(60) Provisional application No. 61/507,048, filed on Jul. 12, 2011, provisional application No. 61/507,059, filed on Jul. 12, 2011, provisional application No. 61/507,067, filed on Jul. 12, 2011, provisional application No. 61/508,570, filed on Jul. 15, 2011.

(51) Int. Cl.
| | |
|---|---|
| B05D 1/02 | (2006.01) |
| B05D 1/04 | (2006.01) |
| B05D 3/12 | (2006.01) |
| H01M 2/16 | (2006.01) |
| H01M 2/18 | (2006.01) |
| H01M 10/0525 | (2010.01) |
| H01M 4/04 | (2006.01) |
| H01M 4/131 | (2010.01) |
| H01M 4/1391 | (2010.01) |
| H01M 4/485 | (2010.01) |
| H01M 4/505 | (2010.01) |
| H01M 4/525 | (2010.01) |
| H01M 4/58 | (2010.01) |

(52) U.S. Cl.
CPC ........ *H01M 10/0525* (2013.01); *H01M 4/0404* (2013.01); *H01M 4/0419* (2013.01); *H01M 4/0435* (2013.01); *H01M 4/131* (2013.01); *H01M 4/1391* (2013.01); *H01M 4/485* (2013.01); *H01M 4/505* (2013.01); *H01M 4/525* (2013.01); *H01M 4/5825* (2013.01); *Y02E 60/122* (2013.01)
USPC ............. 427/468; 427/470; 427/58; 427/427; 427/369; 429/145

(58) Field of Classification Search
USPC ............. 427/58, 369, 427, 468, 470; 429/145
See application file for complete search history.

(56) References Cited

U.S. PATENT DOCUMENTS

| | | | |
|---|---|---|---|
| 5,728,490 A | 3/1998 | Edgington et al. | |
| 7,553,584 B2 | 6/2009 | Chiang et al. | |

(Continued)

FOREIGN PATENT DOCUMENTS

| | | |
|---|---|---|
| JP | 2005-116509 | 4/2005 |
| JP | 2006261020 A | 9/2006 |
| JP | 2007-214038 A | 8/2007 |

OTHER PUBLICATIONS

International Search Report and Written Opinion dated Jan. 30, 2013 for PCT/US2012/044022.

*Primary Examiner* — Frederick Parker
(74) *Attorney, Agent, or Firm* — Patterson & Sheridan, LLP

(57) ABSTRACT

A method and apparatus for forming lithium-ion batteries and battery cell components, and more specifically, to a system and method for fabricating such batteries and battery cell components using deposition processes that form three-dimensional porous structures are provided. One method comprises texturing a conductive substrate by calendering the conductive substrate between opposing wire mesh structures, forming a first layer of cathodically active material having a first porosity on the surface of the textured conductive substrate, and forming a second layer of cathodically active material having a second porosity on the first layer, wherein the second porosity is greater than the first porosity.

12 Claims, 17 Drawing Sheets

(56) References Cited

U.S. PATENT DOCUMENTS

| | | |
|---|---|---|
| 7,579,112 B2 | 8/2009 | Chiang et al. |
| 7,662,265 B2 * | 2/2010 | Chiang et al. ............ 204/491 |
| 7,781,098 B2 | 8/2010 | Chiang et al. |
| 2003/0082446 A1 * | 5/2003 | Chiang et al. ............ 429/209 |
| 2004/0053100 A1 * | 3/2004 | Stanley et al. ............ 429/30 |
| 2005/0064291 A1 | 3/2005 | Sato et al. |
| 2006/0251965 A1 | 11/2006 | Nagayama et al. |
| 2011/0070493 A1 | 3/2011 | Gadkaree et al. |
| 2011/0129732 A1 | 6/2011 | Bachrach et al. |
| 2011/0168550 A1 | 7/2011 | Wang et al. |

* cited by examiner

METHODS TO FABRICATE VARIATIONS IN POROSITY OF LITHIUM ION BATTERY ELECTRODE FILMS

CROSS-REFERENCE TO RELATED APPLICATIONS

This application claims benefit of United States Provisional Patent Application Ser. No. 61/507,048, filed Jul. 12, 2011, United States Provisional Patent Application Ser. No. 61/507,059, filed Jul. 12, 2011, United States Provisional Patent Application Ser. No. 61/507,067, filed Jul. 12, 2011, and United States Provisional Patent Application Ser. No. 61/508,570, filed Jul. 15, 2011 all of which are herein incorporated by reference in their entirety.

GOVERNMENT RIGHTS IN THIS INVENTION

This invention was made with Government support under DE-AR0000063 awarded by DOE. The Government has certain rights in this invention.

BACKGROUND OF THE INVENTION

1. Field of the Invention

Embodiments of the present invention generally relate to lithium-ion batteries and battery cell components, and more specifically, to a system and method for fabricating such batteries and battery cell components using mechanical and deposition processes that form three-dimensional porous structures.

2. Description of the Related Art

High-capacity energy storage devices, such as lithium-ion (Li-ion) batteries, are used in a growing number of applications, including portable electronics, medical, transportation, grid-connected large energy storage, renewable energy storage, and uninterruptible power supply (UPS).

One method for manufacturing Li-ion battery cell electrodes is principally based on slit coating of viscous powder slurry mixtures of cathodically or anodically active material onto a conductive current collector followed by prolonged heating to form a dried cast sheet and prevent cracking. The thickness of the electrode after drying which evaporates the solvents is finally determined by compression or calendering which adjusts the density and porosity of the final layer. Slit coating of viscous slurries is a highly developed manufacturing technology which is very dependent on the formulation, formation, and homogenization of the slurry. The formed active layer is sensitive to the rate and thermal details of the drying process.

Because the dried cast sheet must adhere well to the metal current collector, the mixture typically includes a binder which promotes adhesion. Binding is further augmented by the compression process which adjusts the density of the active sheet and also embeds some of the bound particles into the metal current collector.

For most energy storage applications, the charge time and energy capacity of energy storage devices are important parameters. In addition, the size, weight, and/or expense of such energy storage devices are significant specifications.

In order to make higher loading batteries, a thicker layer of active material is required, but as the active material layer gets thicker, it becomes more difficult for Li-ions to travel through the film and the overall use of the active material becomes less efficient.

Accordingly, there is a need in the art for faster charging, higher capacity energy storage devices that are smaller, lighter, and can be more cost effectively manufactured at a high production rate.

SUMMARY OF THE INVENTION

Embodiments of the present invention generally relate to lithium-ion batteries and battery cell components, and more specifically, to a system and method for fabricating such batteries and battery cell components using deposition processes that form three-dimensional porous structures. In one embodiment, a method for forming a graded cathode structure is provided. The method comprises texturing a conductive substrate by calendering the conductive substrate between opposing wire mesh structures, forming a first layer of cathodically active material having a first porosity on the surface of the textured conductive substrate, and forming a second layer of cathodically active material having a second porosity on the first layer, wherein the second porosity is greater than the first porosity.

In another embodiment, a method for forming a graded cathode structure is provided. The method comprises depositing a cathodically active material having a first porosity onto the surface of a wire mesh structure comprising wires having openings formed between the wires and forming a first region of cathodically active material having a second porosity by compressing the cathodically active material on the wires while the cathodically active material deposited in the openings maintains the first porosity, wherein the first porosity is greater than the second porosity.

In another embodiment, a method for forming a graded cathode structure is provided. The method comprises forming a patterned layer of cathodically active material on a conductive substrate by spraying the cathodically active material through openings of a patterned mask positioned above the substrate, wherein the patterned layer comprises a plurality of cathodically active features having one more channels disposed therebetween, forming a blanket layer of the cathodically active material over the patterned layer of cathodically active material, and compressing the as-deposited patterned layer and blanket layer to form a plurality of first regions comprising the plurality of cathodically active features with blanket material deposited thereon and one or more second regions comprising the blanket material deposited in the one or more channels disposed between the cathodically active features, wherein the plurality of first regions has an average first porosity and the one or more second regions has an average second porosity that is greater than the first porosity.

In another embodiment, a method and apparatus is provided for forming a graded cathode structure. The method comprises depositing a cathodically active material having a first porosity on a conductive substrate and selectively patterning regions of the cathodically active material to achieve a second porosity in the patterned regions.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
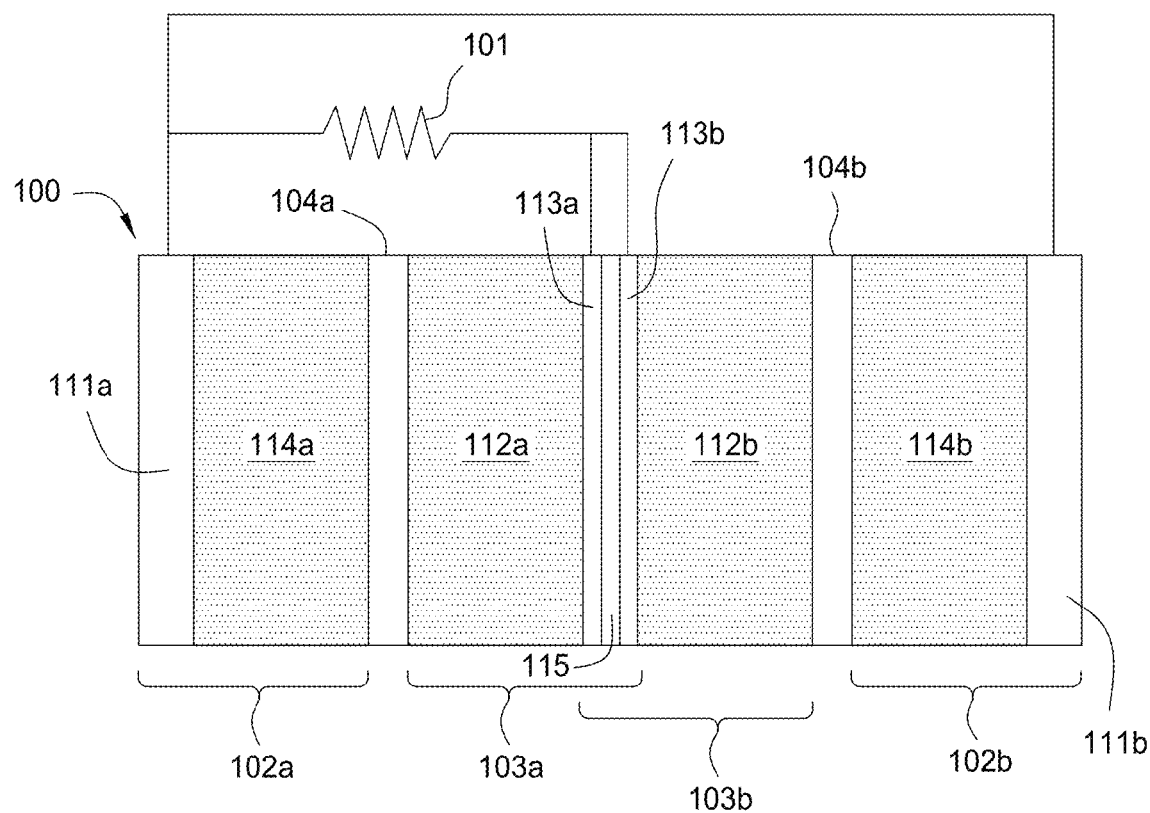
FIG. 1 is a schematic diagram of one embodiment of a Li-ion battery cell bi-layer electrically connected to a load according to embodiments described herein.

Embodiments of the present invention generally relate to lithium-ion batteries and battery cell components, and more specifically, to a system and method for fabricating such batteries and battery cell components using mechanical and deposition processes that form three-dimensional porous structures.

As used herein, the term calendering refers to a process where deposited material is passed through and compressed under rollers at elevated temperatures and pressures.

Current electrodes for Li-ion batteries are manufactured using a slit coating process to deposit a cathodically active material followed by a slow drying process, and a final calender step to define the porosity of the film. In order to make higher loading batteries, a thicker layer of active material is required, but as the layer gets thicker, it becomes more difficult for the lithium ions to travel through the film, so the overall efficiency of the active material decreases. It is believed that the overall efficiency of the active material can be improved by grading the porosity of the active material. Taken a step further, if high porosity channels are available in the lateral dimension to allow for the fast movement of lithium-ions to the lower parts of the film, then thicker (thus higher loading) electrodes can be fabricated, and could operate quite efficiently.

In certain embodiments, the active material (e.g., nickel-manganese-cobalt oxide or "NMC") is mixed with an electro-conductive material (e.g., carbon black or acetylene black) and a polymeric binder to form a slurry or "paint-like" material. This paint-like material may be electro-sprayed onto a current collector foil to form a blanket cathode film. The current collector is textured prior to deposition of the active material to form a three-dimensional structure.

A metal mesh (e.g., stainless steel) is used to emboss the three-dimensional structures onto the current collector. The current collector (e.g., foil) is sandwiched between two sheets of the SST mesh, and is passed through a set of calender rollers to imprint the pattern of the mesh onto one or both sides of the current collector. This allows a pattern with a pitch of approx 50-100 um to be embossed into the current collector, leaving a 3-dimensional structure. Active material is then deposited using a spray coating process optionally followed by calendering.

Alternatively, the active material may be spray coated directly onto a metal mesh current collector (e.g., aluminum mesh). The spray coating process allows for a porous film to be deposited onto fibers of the metal mesh and will coat both the sides and edges of the fibers. After the calender process, the material deposited on the surface of the fibers will be compressed, but the areas on the edges of the fibers will remain more porous. Thus providing a film having graded porosity.

The porosity ratios are adjustable depending on the exact target use for the battery. After the optional calendering process, the active material may be re-sprayed to further thicken and planarize the patterned cathode film.

While the particular apparatus in which the embodiments described herein can be practiced is not limited, it is particularly beneficial to practice the embodiments on a web-based roll-to-roll system sold by Applied Materials, Inc., Santa Clara, Calif. Exemplary roll-to-roll and discrete substrate systems on which the embodiments described herein may be practiced are described in further detail in commonly assigned U.S. patent application Ser. No. 12/620,788, to Lopatin et al., titled APPARATUS AND METHOD FOR FORMING 3D NANOSTRUCTURE ELECTRODE FOR ELECTROCHEMICAL BATTERY AND CAPACITOR, now published as US 2010/0126849, commonly assigned U.S. patent application Ser. No. 12/839,051, filed Jul. 19, 2010, to Bachrach et al, titled COMPRRESSED POWDER 3D BATTERY ELECTRODE MANUFACTURING, now published as US 2011/0129732, and commonly assigned U.S. patent application Ser. No. 12/880,564, filed Sep. 13, 2010, to Bachrach et al., titled SPRAY DEPOSITION MODULE FOR AN IN-LINE PROCESSING SYSTEM, all of which are herein incorporated by reference in their entirety.

FIG. 1 is a schematic diagram of a Li-ion battery cell bi-layer 100 electrically connected to a load 101, according to one embodiment described herein. The primary functional components of Li-ion battery cell bi-layer 100 include anode structures 102a, 102b, cathode structures 103a, 103b, separator layers 104a, 104b, and an electrolyte (not shown) disposed within the region between current collectors 111a, 111b, 113a, and 113b. A variety of materials may be used as the electrolyte, for example, a lithium salt in an organic solvent. The Li-ion battery cell 100 may be hermetically sealed with electrolyte in a suitable package with leads for the current collectors 111a, 111b, 113a, and 113b. The anode structures 102a, 102b, cathode structures 103a, 103b, and fluid-permeable separator layers 104a, 104b may be immersed in the electrolyte in the region formed between the current collectors 111a and 113a and the region formed between the current collectors 111b and 113b. An insulator layer 115 may be disposed between current collector 113a and current collector 113b.

Anode structures 102a, 102b and cathode structures 103a, 103b each serve as a half-cell of Li-ion battery 100, and together form a complete working bi-layer cell of Li-ion battery 100. Anode structures 102a, 102b each may include a metal current collector 111a, 111b and a first electrolyte containing material 114 (114a, 114b), such as a carbon-based intercalation host material for retaining lithium ions. Similarly, cathode structures 103a, 103b each may include a current collector 113a and 113b respectively and a second electrolyte containing porous material 112 (112a, 112b), such as a metal oxide, for retaining lithium ions. The current collectors 111a, 111b, 113a, and 113b may be made of electrically conductive material such as metals. In some cases, a separator layer 104 (104a, 104b), which is an insulating, porous, fluid-permeable layer, for example, a dielectric layer, may be used to prevent direct electrical contact between the components in the anode structures 102a, 102b and the cathode structures 103a, 103b.

The electrolyte containing porous material on the cathode side of the Li-ion battery 100, or positive electrode, may comprise a lithium-containing metal oxide, such as lithium cobalt dioxide ($LiCoO_2$), lithium manganese dioxide ($LiMnO_2$), or lithium nickel manganese cobalt oxide. The electrolyte containing porous material may be made from a layered oxide, such as lithium cobalt oxide, an olivine, such as lithium iron phosphate, or a spinel, such as lithium manganese oxide. In non-lithium embodiments, an exemplary cathode may be made from $TiS_2$ (titanium disulfide). Exemplary lithium-containing oxides may be layered, such as lithium cobalt oxide ($LiCoO_2$), or mixed metal oxides, such as $LiNi_{1-x}Co_{1-2}MnO_2$, $LiNi_{0.5}Mn_{1.5}O_4$, $Li(Ni_{0.8}CO_{0.15}Al_{0.05})O_2$, $LiMn_2O_4$. Exemplary phosphates may be iron olivine ($LiFePO_4$) and it is variants (such as $LiFe_{1-x}MgPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

The electrolyte containing porous material on the anode side of the Li-ion battery 100, or negative electrode, may be made from materials such as graphitic particles dispersed in a polymer matrix and/or various fine powders, for example, micro-scale or nano-scale sized powders. Additionally, microbeads of silicon, tin, or lithium titanate ($Li_4Ti_5O_{12}$) may be used with, or instead of, graphitic microbeads to provide the conductive core anode material. It should also be understood that although a Li-ion battery cell bi-layer 100 is depicted in FIG. 1, the embodiments described herein are not limited to Li-ion battery cell bi-layer structures. It should also be understood, that the anode and cathode structures may be connected either in series or in parallel.

Texturing of Current Collector and Spray Deposition

Figure 2:
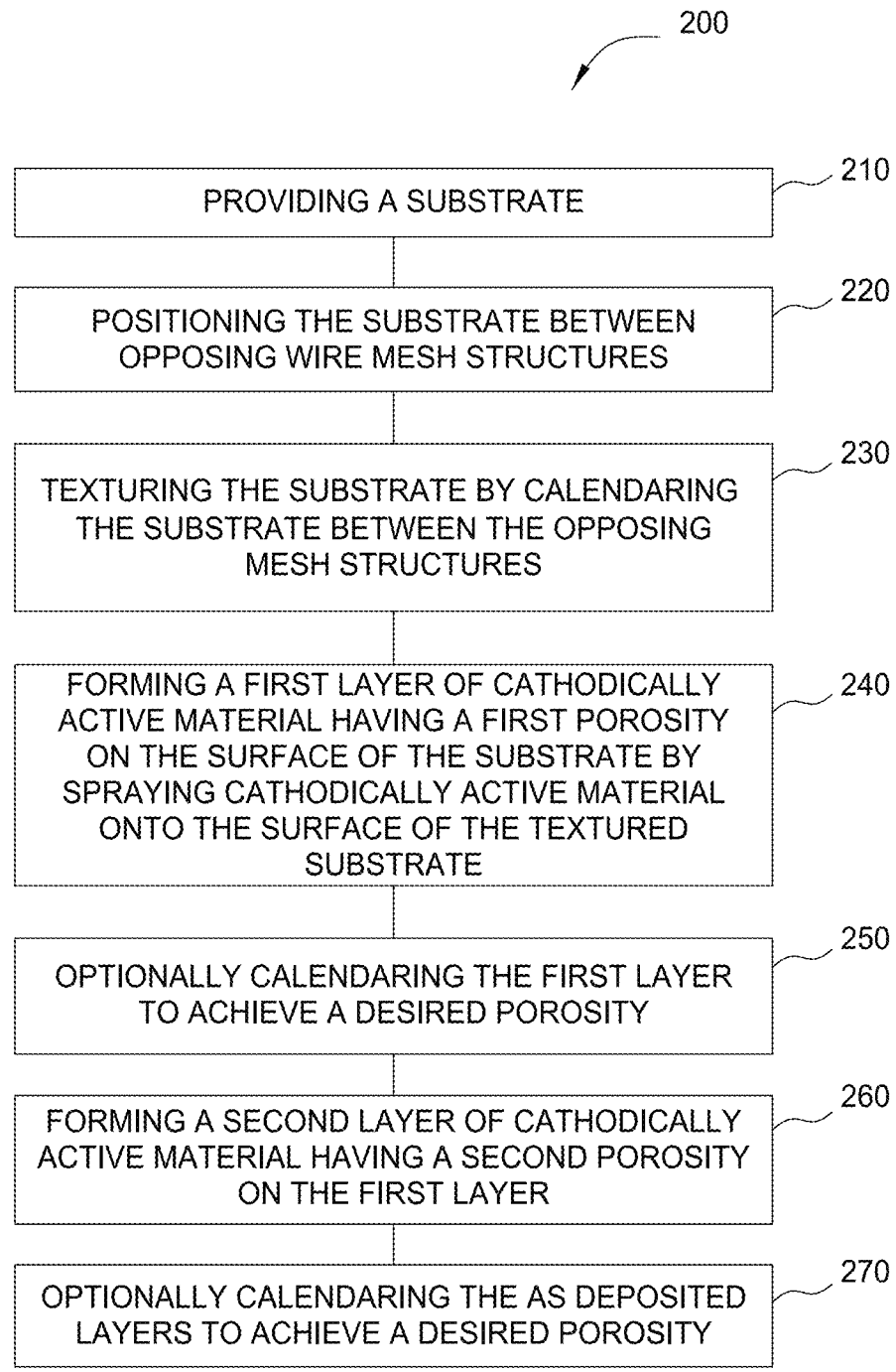
FIG. 2 is a process flow chart summarizing one embodiment of a method for forming an electrode structure according to embodiments described herein.

FIG. 2 is a process flow chart summarizing one embodiment of a method 200 for forming an electrode structure according to embodiments described herein. The electrode structure comprises a cathode structure 350 having a lateral porosity gradient. The cathode structure 350 may be similar to cathode structures 103a, 103b depicted in FIG. 1. FIGS. 3A-3D are schematic cross-sectional views of the electrode at various stages of formation.

Figure 3A:
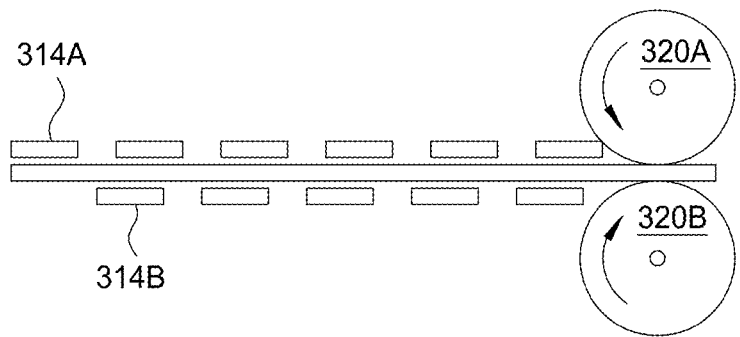
FIGS. 3A-3D are schematic cross-sectional views of one embodiment of an electrode structure at various stages of formation according to embodiments described herein.

At block 210, a substrate 310 is provided. The substrate 310 may be a current collector. The current collector may be similar to current collector 111a, 111b. In FIG. 3A, the substrate 310 is schematically illustrated prior to patterning of the substrate 310 and deposition of a cathodically active material 330A, 330B over the patterned substrate. In one embodiment, the substrate 310 is a conductive substrate (e.g., metallic foil or sheet). The substrate 310 may have an insulating coating disposed thereon. In one embodiment, the substrate 310 may include a relatively thin conductive layer disposed on a host substrate comprising one or more conductive materials, such as a metal, plastic, graphite, polymers, carbon-containing polymer, composites, or other suitable materials. Examples of metals that substrate 310 may be comprised of include aluminum (Al), copper (Cu), zinc (Zn), nickel (Ni), cobalt (Co), palladium (Pd), platinum (Pt), tin (Sn), ruthenium (Ru), stainless steel, alloys thereof, and combinations thereof.

Alternatively, the substrate 310 may comprise a host substrate that is non-conductive, such as a glass, silicon, and plastic or polymeric substrate that has an electrically conductive layer formed thereon by means known in the art, including physical vapor deposition (PVD), electrochemical plating, electroless plating, and the like. in one embodiment, the substrate 310 is formed from a flexible host substrate. The flexible host substrate may be a lightweight and inexpensive plastic material, such as polyethylene, polypropylene or other suitable plastic or polymeric material, with a conductive layer formed thereon. in one embodiment, the conductive layer may be between about 10 and 15 microns thick in order to minimize resistive loss. Materials suitable for use as such a flexible substrate include a polyimide (e.g., KAPTON ™ by DuPont Corporation), polyethylene terephthalate (PET), polyacrylates, polycarbonate, silicone, epoxy resins, silicone-functionalized epoxy resins, polyester (e,g, MYLAR ™ by E.I. du Pont de Nemours & Co.), APICAL AV manufactured by Kanegaftigi Chemical Industry Company, UPILEX manufactured by UBE Industries, Ltd.; polyethersulfones (PES) manufactured by Sumitomo, a polyetherimide (e.g., ULTEM by General Electric Company), and polyethylene naphthalate (PEN). Alternately, the flexible substrate may be constructed from a relatively thin glass that is reinforced with a polymeric coating.

In certain embodiments, the substrate 310 may comprise any of the conductive materials previously described including but not limited to aluminum, stainless steel, nickel, copper, and combinations thereof. The substrate 310 may be in the form of a foil, a film, or a thin plate. In certain embodiments, the substrate 310 may have a thickness that generally ranges from about 1 to about 200 µm. In certain embodiments, the substrate 310 may have a thickness that generally ranges from about 5 to about 100 µm. In certain embodiments, the substrate 310 may have a thickness that ranges from about 10 µm to about 20 µm.

In certain embodiments, the substrate 310 is patterned to form a three dimensional structure. The three-dimensional structure may be formed using, for example, a nano-imprint lithography process or an embossing process.

At block 220, the substrate 310 is positioned between two opposing wire mesh structures 314A, 314B. As shown in FIG. 3A, the opposing wire mesh structures 314A, 314B may be placed in a staggered configuration.

The wire mesh structures 314A, 314B may be made of a material selected from aluminum and alloys thereof. The wire mesh structures 314A, 314B may have a wire diameter between about 0.050 micrometers and about 200 micrometers. The wire mesh structures 314A, 314B may have a wire diameter between about 50 micrometers and about 100 micrometers. In one embodiment, the wire mesh structures 314A, 314B may have an opening between about 5 micrometers and about 200 micrometers. In one embodiment, the wire mesh structures 314A, 314B may have an opening between about 10 micrometers and about 100 micrometers. As used herein with reference to wire mesh, the term "openings" refers to the distance between two adjacent parallel wires. The wire mesh structure may comprise any materials compatible with process chemistries. Exemplary materials include stainless steel, plain steel, and aluminum.

Figure 3B:
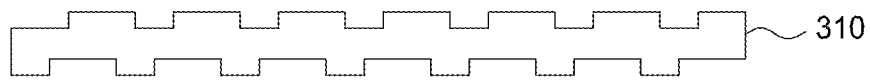
Figure 3C:
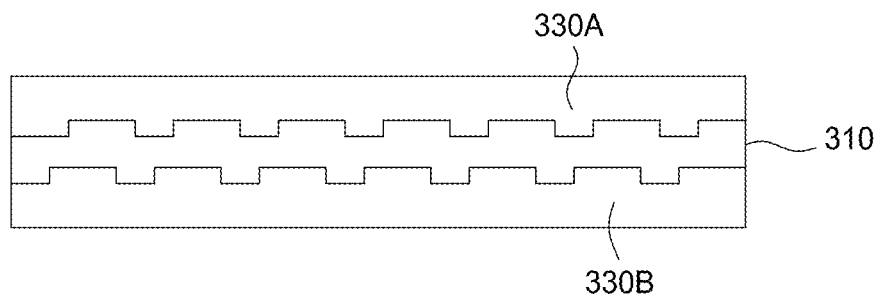

At block 230, the substrate 310 is textured by calendering the substrate 310 positioned between the opposing mesh structures 314A, 314B. The substrate 310 with the opposing mesh structures 314A, 314B may be advanced between a pair of opposing compression members 320A, 320B which press the opposing mesh structures 314A, 314B into the substrate 310 to form the patterned substrate as shown in FIG. 3B. Optionally, the substrate 310 may be heated to increase the plasticity of the substrate 310 during the embossing process. In one embodiment, the compression members 320A, 320B may be heated and used to heat the substrate 310 during the calendering process. The temperature applied during the calendering process may be selected and adjusted depending on the desired final porosity. The pressure applied during the calendering process may be selected and adjusted depending on the desired final porosity.

At block 240, first layers 330A, 330B of cathodically active material having a first porosity are formed on the surface of the patterned substrate 310 by spraying the cathodically active material onto the surface of the a patterned substrate 310. The cathodically active material may be in powder form. The powder form comprising particles of the cathodically active material. Exemplary cathodically active materials include lithium cobalt dioxide ($LiCoO_2$), lithium manganese dioxide ($LiMnO_2$), titanium disulfide ($TiS_2$), $LiNi_xCo_{1-2x}MnO_2$ (NMC), $LiMn_2O_4$, iron olivine ($LiFePO_4$) and it is variants (such as $LiFe_{1-x}MgPO_4$), $LiMoPO_4$, $LiCoPO_4$, $Li_3V_2(PO_4)_3$, $LiVOPO_4$, $LiMP_2O_7$, $LiFe_{1.5}P_2O_7$, $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, $Na_5V_2(PO_4)_2F_3$, $Li_2FeSiO_4$, $Li_2MnSiO_4$, $Li_2VOSiO_4$, and combinations thereof.

The particles of the powder may be nano-scale particles. The nano-scale particles may have a diameter between about 1 nm and about 100 nm. The particles of the powder may be micro-scale particles. The particles of the powder may include aggregated micro-scale particles. The micro-scale particles may have a diameter between about 2 µm and about 15 µm. The particles generally include the components used to form the second electrolyte containing material 112a, 112b of the cathode structures 103a, 103b. A layer of material formed on the surface of a substrate, which contains the particles of the powder will be referred to below as the as-deposited layer.

In certain embodiments, the cathodically active material may be combined with a carrying medium prior to application of the cathodically active material. In one example, the carrying medium may be a liquid that is atomized before entering the processing chamber. The carrying medium may also be selected to nucleate around the electrochemical nanoparticles to reduce attachment to the walls of the processing chamber. Suitable liquid carrying media include water and organic liquids such as alcohols or hydrocarbons. The alcohols or hydrocarbons will generally have low viscosity, such as about 10 cP or less at operating temperature, to afford reasonable atomization. In other embodiments, the carrying medium may also be a gas such as helium, argon, or nitrogen. In certain embodiment, use of a carrying medium with a higher viscosity to form a thicker covering over the powder may be desirable.

In certain embodiments, a precursor used to facilitate binding of the powder with the substrate is blended with the powder prior to deposition on the substrate. The precursor may comprise a binding agent, such as a polymer, to hold the powder on the surface of the substrate. The binding agent will generally have some electrical conductivity to avoid diminishing the performance of the deposited layer. In one embodiment, the binding agent is a carbon containing polymer having a low molecular weight. The low molecular weight polymer may have a number average molecular weight of less than about 10,000 to promote adhesion of the nanoparticles to the substrate. Exemplary binding agents include, but are not limited to, polyvinylidene fluoride (PVDF) styrene-butadiene rubber (SBR), carboxymethyl cellulose (CMC), water soluble binders, and combinations thereof. In one embodiment, N-methyl-2-pyrrolidone (NMP) is used as a carder for the binding agent.

The cathodically active material may be applied by either wet application techniques or dry powder application techniques. Exemplary powder application techniques include but are not limited to electrostatic spraying techniques, thermal or flame spraying techniques, and combinations thereof. Other techniques which may be used include sifting techniques, fluidized bed coating techniques, slit coating techniques, roll coating techniques, and combinations thereof, all of which are known to those skilled in the art.

Electrostatic spraying methods may be used to deposit powder over the patterned substrate 310. Electrostatic spraying charges the powder particles and then sprays the powder particles toward the area to be coated, such as the patterned substrate 310, with an opposite and attractive electric charge. Since the charged powders in the spray stream are attracted toward the area to be coated, the electrostatic process helps minimize overspray and waste.

Thermal or flame spraying techniques may also be used to deposit powder over the patterned current collector 310. Thermal spraying techniques are coating processes in which melted (or heated) materials are sprayed onto a surface. The "feedstock" (coating precursor) is heated by electrical (e.g., plasma or arc) or chemical means (e.g., combustion flame). Coating materials available for thermal spraying include metals, alloys, ceramics, plastics and composites. The coating materials are fed in powder form, heated to a molten or semi-molten state and accelerated towards the substrate in the form of micrometer-size and/or nanometer-size particles.

Combustion or electrical arc discharge is usually used as the source of energy for thermal spraying. Exemplary thermal spraying techniques and apparatus are described in commonly assigned U.S. Provisional patent application Ser. No. 12/862,244, filed Aug. 24, 2010, to Shang et al., titled IN-SITU DEPOSITION OF BATTERY ACTIVE LITHIUM MATERIALS BY THERMAL SPRAYING, now published as US 2011/0045206, which is herein incorporated by reference in its entirety.

In one embodiment, a layer of electrochemically active material is deposited on a substrate in a thermal spray operation. An electrochemical deposition precursor material comprising particles of electrochemically active materials such as lithium metal oxides, which may be any of the electrochemically active compounds described herein, or a mixture thereof, in a water slurry, is exposed to thermal energy to form a stream of electrochemically active nanocrystals that deposit on the substrate. The slurry may be mixed with a carbon-containing fluid, such as an organic compound comprising oxygen and hydrogen, for example isopropyl alcohol, to form a precursor mixture. Sugars may be dissolved in the water carrying medium to add carbon to the mixture, as described above.

The precursor mixture may comprise an electrochemically active material having the general formula $LiNi_wMn_xCo_yO_z$, wherein w, x, and y are each between about 0.3 and 1.5 and z is between about 1.5 and 2.5. The nanocrystals exit the processing chamber entrained in a stream of hot gas. In one embodiment, the nanocrystals exit the processing chamber at a velocity of between about 10 m/sec and about 600 m/sec., such as about 100 m/sec. the stream forming a jet having a length between about 0.1 and 1.5 m, such as about 1 m. The substrate is generally positioned between about 0.1 and 1.5 m from the processing chamber.

As deposited, the first layers 330A, 330B of cathodically active material may have a "first porosity" or "high porosity" of at least 40%, 45%, 50%, 55%, 60%, or 65% as compared to a solid film formed from the same material. The first layers 330A, 330B of cathodically active material may have a first porosity or "high porosity" of up to 45%, 50%, 55%, 60%, 65%, or 70% as compared to a solid film formed from the same material. The first porosity may be between about 40% and about 70% as compared to a solid film formed from the same material. The porosity of the as-deposited layer may be controlled by modifying different parameters. Exemplary parameters include the particle size of the cathodically active material, the amount of binder used, and/or the velocity of the cathodically active material if a spray process is used to deposit the cathodically active material.

The first layers 330A, 330B of cathodically active material may have a "first porosity" or "low porosity" of at least 20%, 25%, 30%, or 35% as compared to a solid film formed from the same material. The first layers 330A, 330B of cathodically active material may have a first porosity or "low porosity" of up to 25%, 30%, 35%, or 40% as compared to a solid film formed from the same material. The first porosity may be between about 20% and about 40% as compared to a solid film formed from the same material.

The first layers 330A, 330B of cathodically active material may individually have an average thickness between about 10 μm to about 200 μm. In one embodiment, the first layers 330A, 330B may have an average thickness between about 50 μm to about 100 μm.

Optionally, at block 250, the first layers 330A, 330B may be exposed to a compression process to achieve a desired porosity. Exemplary compression processes include calendering processes and stamping processes. In certain embodiments, where the surface of the first layers 330A, 330B mimics the pattern of the patterned substrate 310, it may be desirable to planarize the surface of the first layers 330A, 330B. Planarization of the first layers 330A, 330B may be achieved via at least one of the aforementioned compression processes and/or depositing additional cathodically active material over the surfaces of the first layers 330A, 330B.

Figure 3D:
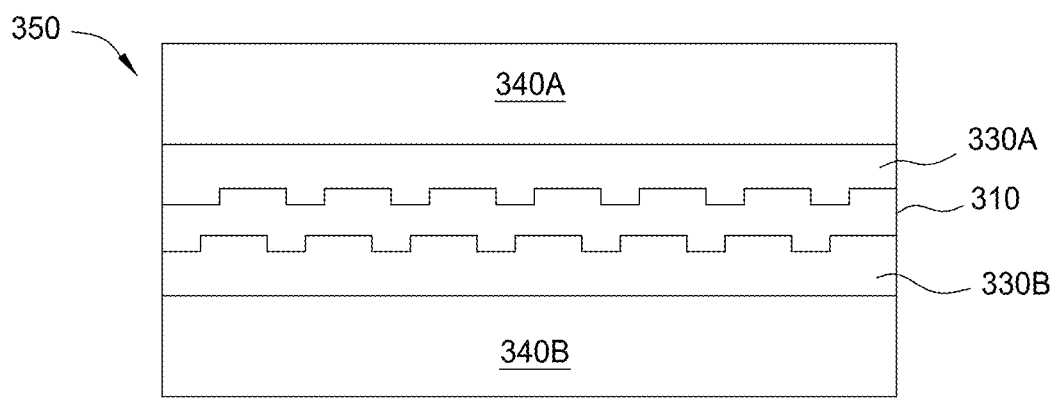

At block 260, second layers 340A, 340B of cathodically active material having a second porosity are formed over the first layers 330A, 330B to form the cathode structure 350 as shown in FIG. 3D. The cathodically active material of the second layers 340A, 340B may be the same as the first cathodically active material or it may be different.

As deposited, the second layers 340A, 340B of cathodically active material may have a "second porosity" or "high porosity" of at least 40%, 45%, 50%, 55%, 60%, or 65% as compared to a solid film formed from the same material. In certain embodiments, the second layers 340A, 340B of cathodically active material may have a second porosity or "high porosity" of up to 45%, 50%, 55%, 60%, 65%, or 70% as compared to a solid film formed from the same material. In one embodiment, the second porosity is between about 40% and about 70% as compared to a solid film formed from the same material.

The second layers 340A, 340B of cathodically active material may have a "second porosity" or "low porosity" of at least 20%, 25%, 30%, or 35% as compared to a solid film formed from the same material. The second layers 340A, 340B of cathodically active material may have a second porosity or "low porosity" of up to 25%, 30%, 35%, or 40% as compared to a solid film formed from the same material. The second porosity may be between about 20% and about 40% as compared to a solid film formed from the same material. In certain embodiments, the second porosity is greater than the first porosity. In certain embodiments, the second porosity is less than the first porosity.

The second layers 340A, 340B of cathodically active material may individually have an average thickness between about 10 μm to about 200 μm. In one embodiment, the second layers 340A, 340B may have an average thickness between about 50 μm to about 100 μm.

Optionally, at block 270, the as-deposited layers may be exposed to a compression process to achieve a desired porosity. In certain embodiments, where the surface of the second layers 340A, 340B mimics the pattern of the patterned substrate 310, it may be desirable to planarize the surface of the second layers 340A, 340B. Planarization of the second layers 340A, 340B may be achieved via at least one of the aforementioned compression processes and depositing additional cathodically active material over the surfaces of the second layers 340A, 340B.

In certain embodiments, a separator layer (not shown) may be formed over the cathode structure 350. The separator layer is a dielectric, porous, fluid-permeable layer that prevents direct electrical contact between the components in the anode structure and the cathode structure. The separator layer may be deposited directly onto the surface of the cathode structure 350. Exemplary processes for depositing the separator layer include electrospraying processes and electrospinning processes. The separator layer may be a solid polymeric layer. Exemplary materials for forming the separator layer include polyolefin, polypropylene, polyethylene, and combinations thereof.

Figure 4A:
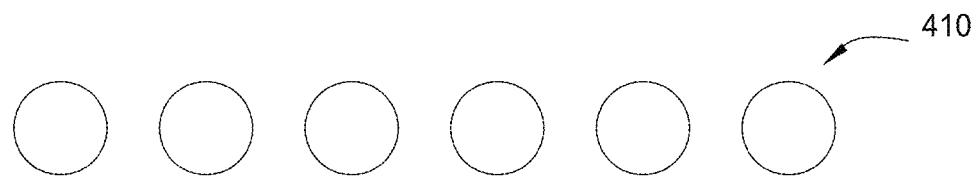
FIGS. 4A-4C are schematic cross-sectional view of one embodiment of another electrode structure at various stages of formation according to embodiments described herein.
Figure 4B:
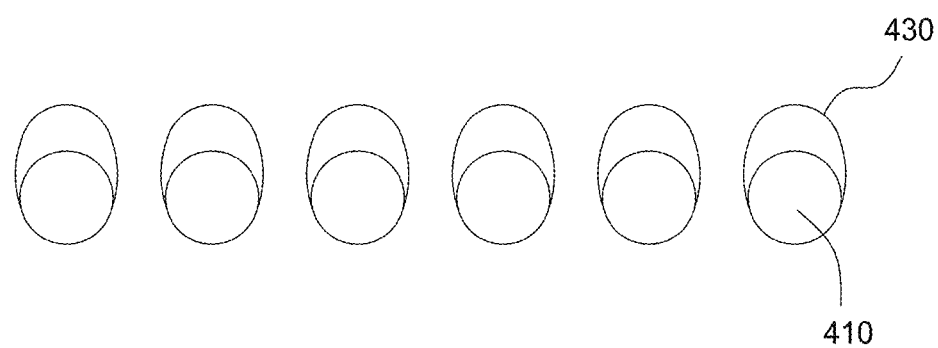
Figure 4C:
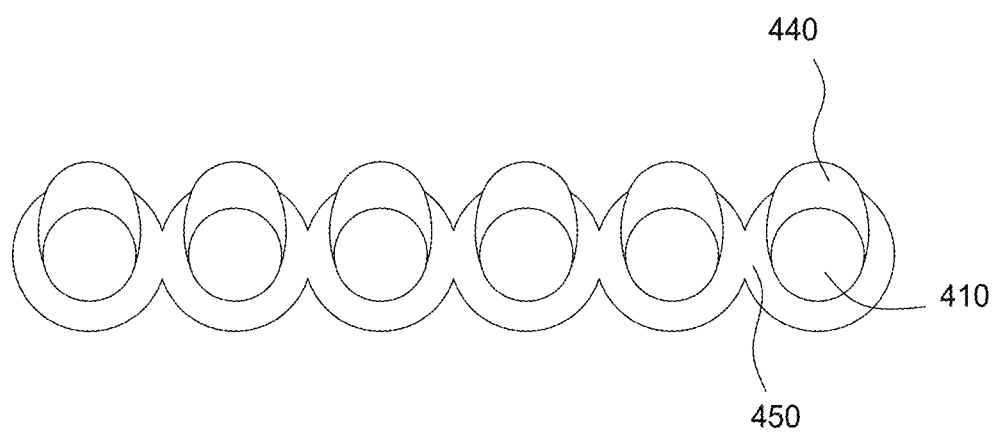

FIGS. 4A-4C are schematic cross-sectional view of another electrode structure at various stages of formation according to embodiments described herein. In the embodiment depicted in FIGS. 4A-4C, the substrate is a wire mesh structure 410. A cross-section of the wire mesh structure 410 is depicted in FIG. 4A. The wire mesh structure 410 may be made of a material selected from aluminum and alloys thereof. The wire mesh structure 410 may have a wire diameter between about 0.050 micrometers and about 200 micrometers. The wire mesh structure 410 may have a wire diameter between about 50 micrometers and about 100 micrometers. The wire mesh structure 410 may have an opening between about 5 micrometers and about 200 micrometers. The wire mesh structure 410 may have an opening between about 10 micrometers and about 100 micrometers.

As depicted in FIG. 4B, a first layer 430 of cathodically active material having a first porosity is formed on the surface of the wire mesh structure 410 by spraying the cathodically active material onto the surface of the wire mesh structure 410. The cathodically active material may comprise the cathodically active materials previously described. The cathodically active material may be deposited using any of the aforementioned deposition techniques. The first porosity may be a "high porosity" of at least 40%, 45%, 50%, 55%, 60%, or 65% as compared to a solid film formed from the same material. The first porosity may be a "high porosity" of up to 45%, 50%, 55%, 60%, 65%, or 70% as compared to a solid film formed from the same material. The first porosity may be between about 40% and about 70% as compared to a solid film formed from the same material.

The first layer 430 of cathodically active material is exposed to a compression process. As shown in FIG. 4C, the regions of cathodically active material 440 positioned directly above wires of the wire mesh structure 410 are compressed to a second porosity which is less than the first porosity. The regions of cathodically active material 450 positioned between the wires of the wire mesh structure maintain the as-deposited porosity or first porosity. The second porosity may be a "low porosity" of at least 20%, 25%, 30%, or 35% as compared to a solid film formed from the same material. The second porosity may be a "low porosity" of up to 25%, 30%, 35%, or 40% as compared to a solid film formed from the same material. The second porosity is between about 20% and about 40% as compared to a solid film formed from the same material. In certain embodiments, the second porosity is less than the first porosity.

Figure 5B:
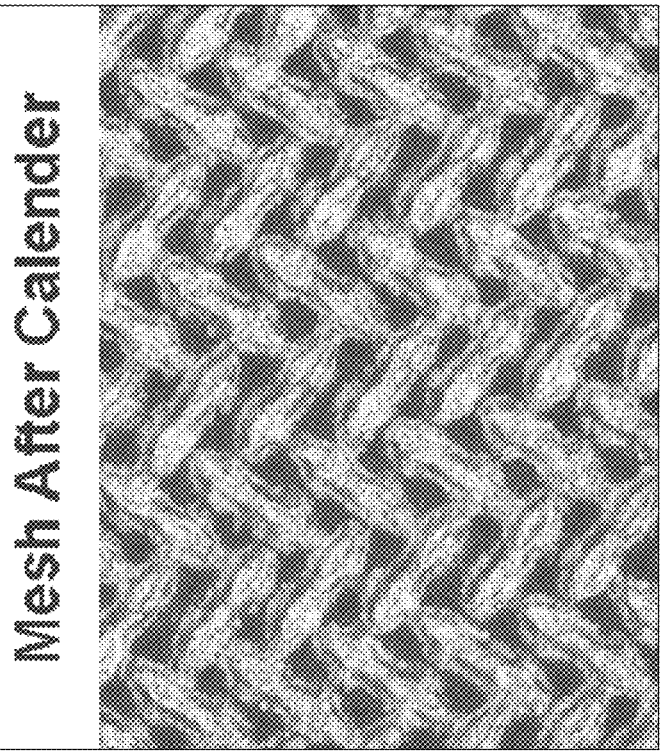
FIG. 5B is an SEM photograph depicting the mesh substrate of FIG. 5A with cathodically active material deposited thereon after a calendering process.
Figure 5A:
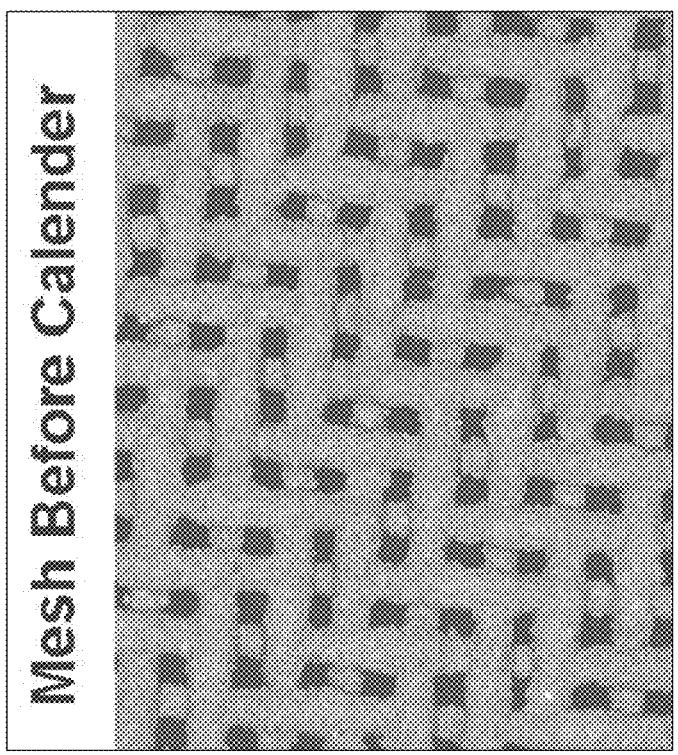
FIG. 5A is an SEM photograph depicting one embodiment of a mesh substrate with cathodically active material deposited thereon before exposure to a calendering process according to embodiments described herein.

FIG. 5A is an SEM photograph depicting a mesh substrate with cathodically active material deposited thereon before exposure to a calendering process according to embodiments described herein. The cathodically active material is NMC (nickel-manganese-cobalt) which was deposited using a dry spray process. FIG. 5B is an SEM photograph depicting the mesh substrate of FIG. 5A with cathodically active material deposited thereon after a calendering process. After the calendering process, the regions of NMC material directly above the wires demonstrated reduced porosity from about 60% porosity to about 30% porosity whereas regions of the NMC material not exposed to calendering (e.g., material deposited in the openings between the wires) maintained porosities similar to the initial porosity of 60%.

Figure 6B:
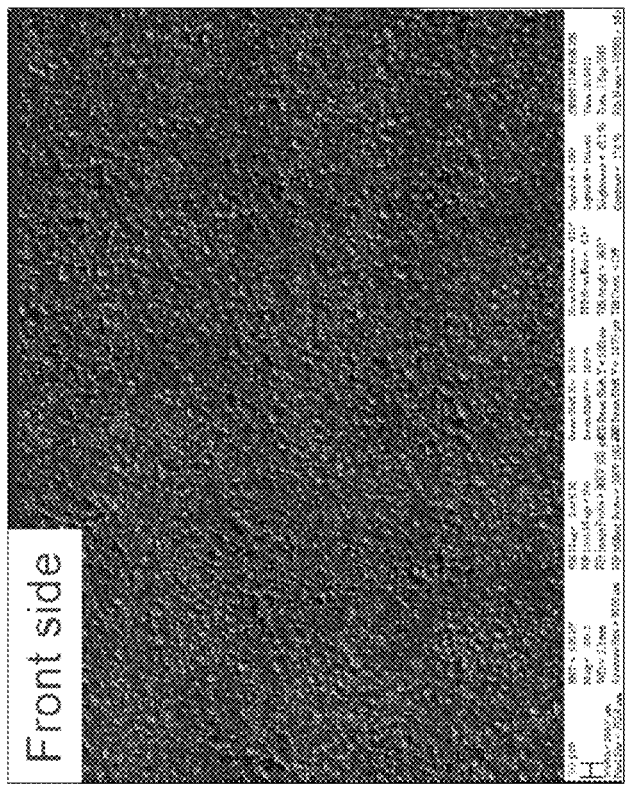
FIG. 6B is an SEM photograph depicting the front of the mesh substrate of FIG. 6A.
Figure 6A:
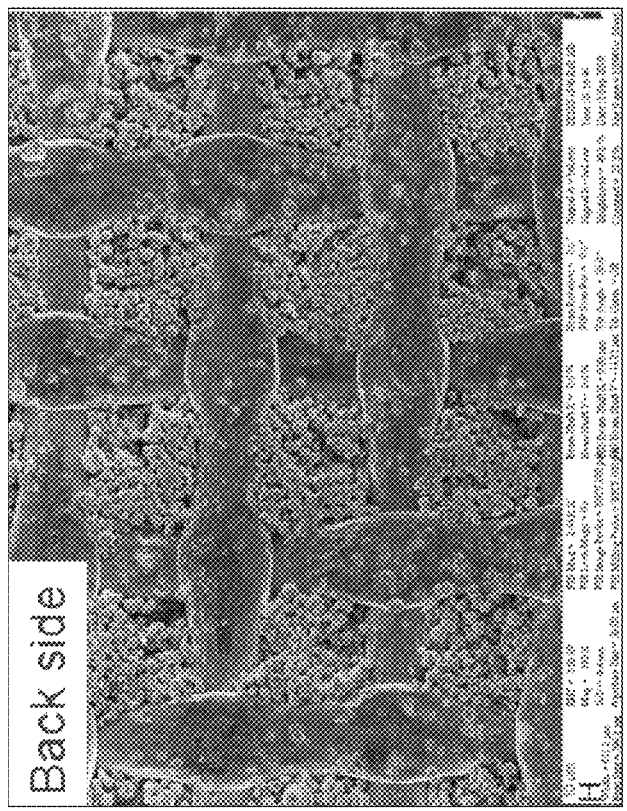
FIG. 6A is an SEM photograph depicting one embodiment of the back of a mesh substrate with cathodically active material deposited thereon after a calendering process.

FIG. 6A is an SEM photograph depicting the back of a mesh substrate with cathodically active material deposited thereon after a calendering process. The back of the mesh structure shows "high porosity" porous active material between the fibers of the mesh after the calendering process.

FIG. 6B is an SEM photograph depicting the front of the mesh substrate of FIG. 6A after the calendering process. The front of the mesh substrate shows a dense, low porosity layer, with the underlying mesh structure no longer visible.

Example

The following prophetic non-limiting example is provided to further illustrate embodiments described herein. However, the example is not intended to be all inclusive and is not intended to limit the scope of the embodiments described herein.

Nickel-manganese-cobalt oxide or "NMC" is mixed with carbon black or acetylene black) and styrene butadiene rubber ("SBR") to form a slurry material comprising 91% by weight NMC, 3% by weight SBR, and 6% by weight carbon black. The slurry is electro-sprayed onto a stainless steel wire mesh to form a blanket cathode film. As-deposited, the blanket cathode film has an initial porosity of 60% when compared with a solid film formed from the same material. The blanket film is then calendered to locally compress and reduce the porosity of select areas of the cathode film. After the calendering process, the regions of NMC material directly above the wires demonstrated reduced porosity from about 60% porosity to about 30% porosity whereas regions of the NMC material not exposed to calendering (e.g., material deposited in the openings between the wires) maintained porosities similar to the initial porosity of 60%.

Variations in Porosity Using Two Step Deposition Process

As used herein, the term calendering refers to a process where deposited material is passed through and compressed under rollers at elevated temperatures and pressures.

Current electrodes for Li-ion batteries are manufactured using a slit coating process to deposit a cathodically active material followed by a slow drying process, and a final calender step to define the porosity of the film. In order to make higher loading batteries, a thicker layer of active material is required, but as the layer gets thicker, it becomes more difficult for the lithium ions to travel through the film, so the overall efficiency of the active material decreases. It is believed that the overall efficiency of the active material can be improved by grading the porosity of the active material. Taken a step further, if high porosity channels are available in the lateral dimension to allow for the fast movement of lithium-ions to the lower parts of the film, then thicker (thus higher loading) electrodes can be fabricated, and could operate quite efficiently.

Figure 7:
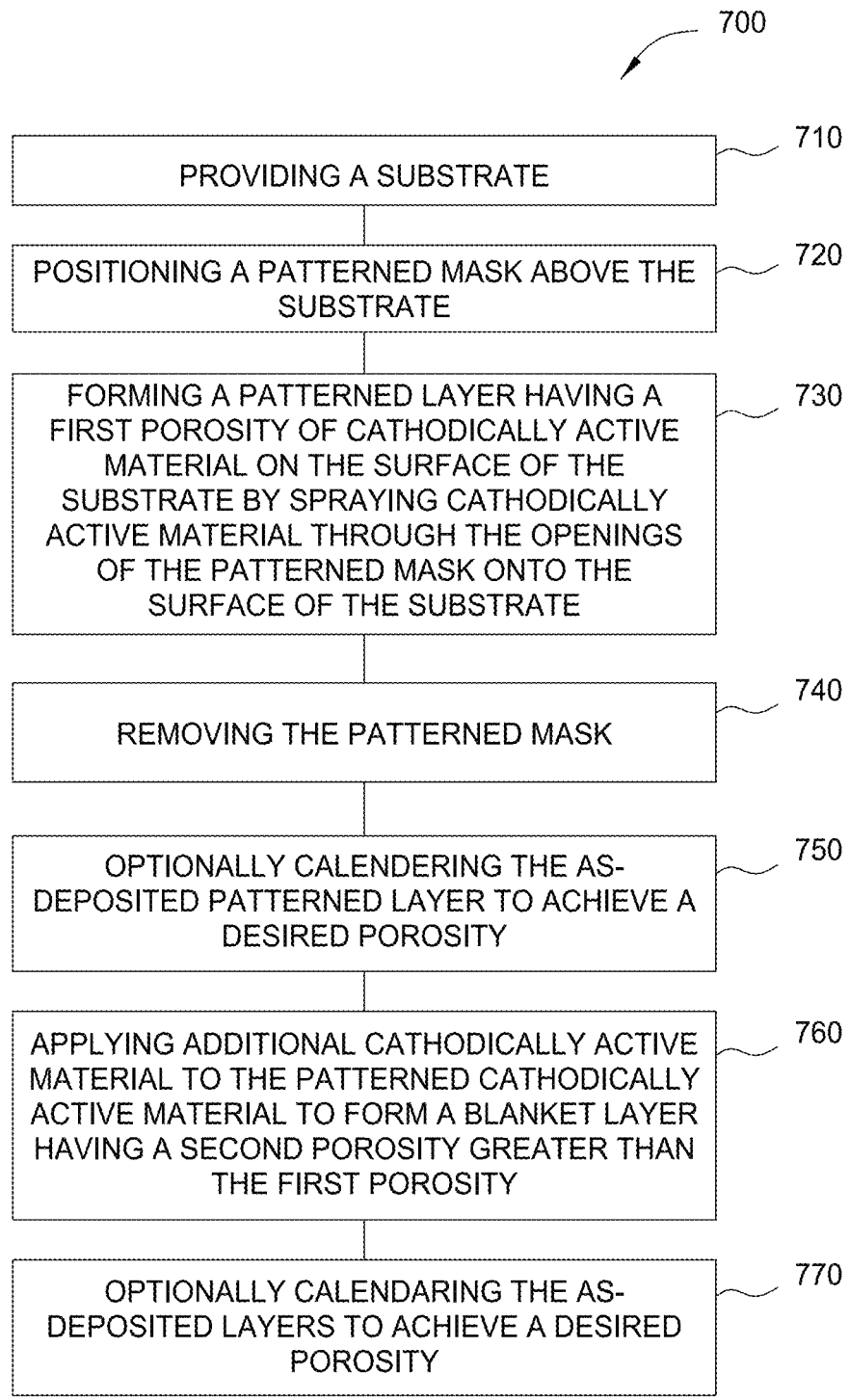
FIG. 7 is a process flow chart summarizing one embodiment of a method for forming an electrode structure according to embodiments described herein.

FIG. 7 is a process flow chart summarizing one embodiment of a method 700 for forming an electrode structure according to embodiments described herein. The electrode structure comprises a cathode structure 803 having a lateral porosity gradient. The cathode structure 803 may be similar to cathode structures 103a, 103b depicted in FIG. 1. FIGS. 8A-8E are schematic cross-sectional views of the electrode at various stages of formation.

Figure 8A:
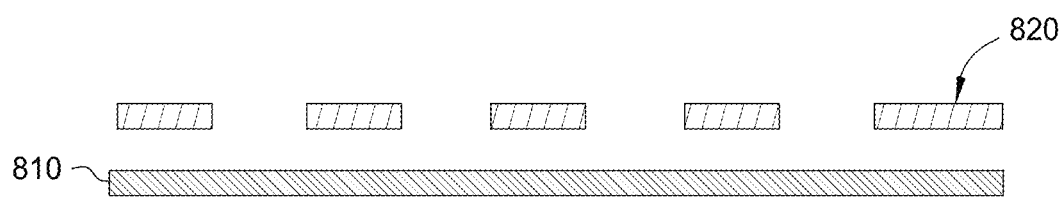
FIGS. 8A-8E are schematic cross-sectional views of one embodiment of an electrode structure at various stages of formation according to embodiments described herein.
Figure 8B:
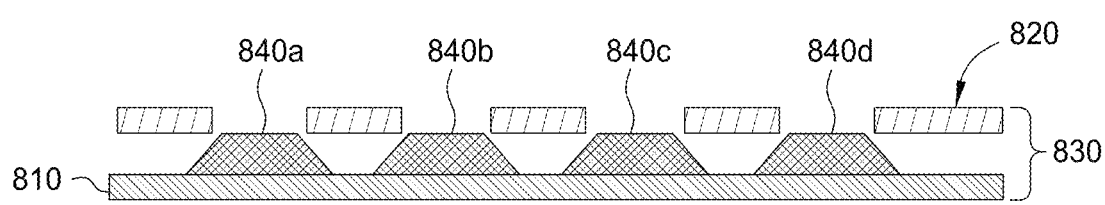

At block 710, a substrate 810 is provided. The substrate may be a current collector. The current collector may be similar to current collector 111a, 111b. In FIG. 8A, the substrate 810 is schematically illustrated prior to the deposition of a cathodically active material. In one embodiment, the substrate 810 is a conductive substrate (e.g., metallic foil, sheet, and plate). The substrate 810 may have an insulating coating disposed thereon. In one embodiment, the substrate 810 may include a relatively thin conductive layer disposed on a host substrate comprising one or more conductive materials, such as a metal, plastic, graphite, polymers, carbon-containing polymer, composites, or other suitable materials. Examples of metals that substrate 810 may be comprised of include aluminum (Al), copper (Cu), zinc (Zn), nickel (Ni), cobalt (Co), palladium (Pd), platinum (Pt), tin (Sn), ruthenium (Ru), stainless steel, alloys thereof, and combinations thereof. In one embodiment, the substrate 810 is perforated.

Alternatively, the substrate 810 may comprise a host substrate that is non-conductive, such as a glass, silicon, and plastic or polymeric substrate that has an electrically conductive layer formed thereon by means known in the art, including physical vapor deposition (PVD), electrochemical plating, electroless plating, and the like. In one embodiment, the substrate 810 is formed from a flexible host substrate. The flexible host substrate may be a lightweight and inexpensive plastic material, such as polyethylene, polypropylene or other suitable plastic or polymeric material, with a conductive layer formed thereon. In one embodiment, the conductive layer may be between about 10 and 15 microns thick in order to minimize resistive loss. Materials suitable for use as such a flexible substrate include a polyimide (e.g., KAPTON™ by DuPont Corporation), polyethylene terephthalate (PET), polyacrylates, polycarbonate, silicone, epoxy resins, silicone-functionalized epoxy resins, polyester (e.g., MYLAR ™ by El. du Pont de Nemours & Co.), APICAL AV manufactured by Kanegaftigi Chemical Industry Company, UPILEX manufactured by UBE Industries, Ltd.; polyethersulfones (PES) manufactured by Sumitomo, a polyetherimide (e.g., ULTEM by General Electric Company), and polyethylene naphthalate (PEN). Alternately, the flexible substrate may be constructed from a relatively thin glass that is reinforced with a polymeric coating.

In certain embodiments, the substrate 810 may comprise any of the conductive materials previously described including but not limited to aluminum, stainless steel, nickel, copper, and combinations thereof. The substrate 810 may be in the form of a foil, a film, or a thin plate. In certain embodiments, the substrate 810 may have a thickness that generally ranges from about 1 to about 200 μm. In certain embodiments, the substrate 810 may have a thickness that generally ranges from about 5 to about 100 μm. In certain embodiments, the substrate 810 may have a thickness that ranges from about 10 μm to about 20 μm.

At block 720, a patterned mask 820 is positioned over the substrate 810. The mask may be a laminar shadow mask, particularly a shadow mask processed from a metal sheet. A laminar mask is a shadow mask composed of a thin metal mask sheet which has a number of openings to allow coating particles to pass through the mask and form a pattern of material on a substrate. The patterned mask 820 may comprise any material or materials compatible with process chemistries and process conditions.

The patterned mask 820 may be a wire mesh structure. The wire mesh structure may have a wire diameter between about 0.050 micrometers and about 200 micrometers. The wire mesh structure may have a wire diameter between about 50 micrometers and about 100 micrometers. The wire mesh structure may have openings between about 5 micrometers and about 200 micrometers. The wire mesh structure may have openings between about 10 micrometers and about 100 micrometers. As used herein with reference to wire mesh, the term "openings" refers to the distance between two adjacent parallel wires. The wire mesh structure may comprise any materials compatible with process chemistries. Exemplary materials include stainless steel, plain steel, and aluminum.

At block 730, a patterned layer 830 of cathodically active material having a first porosity is formed on the surface of the substrate 810 by spraying the cathodically active material through the openings of the patterned mask 820 onto the surface of the substrate. The as-deposited patterned layer 830 may form any type of periodic structure depending upon the pattern of the patterned mask. Exemplary patterns include checkerboard patterns and repeating dot patterns.

Figure 8C:
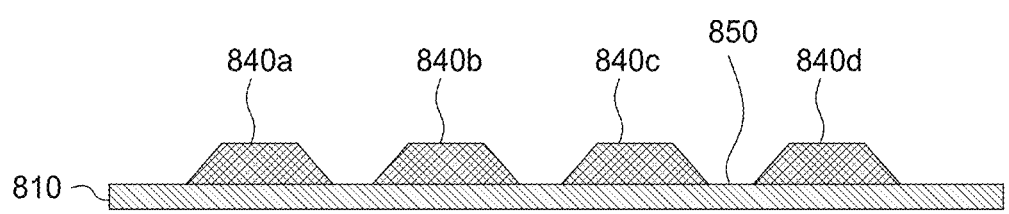

As depicted in FIG. 8C, the patterned layer 830 has a series of cathodically active material features 840a-840d separated by a channel 850 or series of channels. The size of the active material features should be comparable to the thickness of the film such that lower parts of the electrode can be easily accessed by the lithium-ions and electrolyte via either the surface or the high porosity lateral channels. The patterned layer 830 of cathodically active material may have an average thickness from about 10 μm to about 200 μm. In one embodiment, the patterned layer 830 may have a thickness between about 50 μm to about 100 μm. It should also be understood that the patterned layer may be formed using other deposition techniques including silk screen printing technology.

The cathodically active material may be in powder form. The powder form comprising particles of the cathodically active material. Exemplary cathodically active materials include lithium cobalt dioxide ($LiCoO_2$), lithium manganese dioxide ($LiMnO_2$), titanium disulfide ($TiS_2$), $LiNix Co_{1-2x}MnO_2$ (NMC), $LiMn_2O_4$, iron olivine ($LiFePO_4$) and it is variants (such as $LiFe_{1-x}MgPO_4$), $LiMoPO_4$, $LiCoPO_4$, $Li_3V_2(PO_4)_3$, $LiVOPO_4$, $LiMP_2O_7$, $LiFe_{1.5}P_2O_7$, $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, $Na_5V_2(PO_4)_2F_3$, $Li_2FeSiO_4$, $Li_2MnSiO_4$, $Li_2VOSiO_4$, and combinations thereof.

The particles of the powder may be nano-scale particles. The nano-scale particles have a diameter between about 1 nm and about 100 nm. The particles of the powder may be micro-scale particles. The particles of the powder may include aggregated micro-scale particles. The micro-scale particles may have a diameter between about 2 μm and about 15 μm. The particles generally include the components used to form the second electrolyte containing porous material 112a, 112b of the cathode structures 103a, 103b. A layer of material formed on the surface of a substrate, which contains the particles of the powder will be referred to below as the as-deposited layer.

In certain embodiments, the cathodically active material may be combined with a carrying medium prior to application of the cathodically active material. In one example, the carrying medium may be a liquid that is atomized before entering the processing chamber. The carrying medium may also be selected to nucleate around the electrochemical nanoparticles to reduce attachment to the walls of the processing chamber. Suitable liquid carrying media include water and organic liquids such as alcohols or hydrocarbons. The alcohols or hydrocarbons will generally have low viscosity, such as about 10 cP or less at operating temperature, to afford reasonable atomization. In other embodiments, the carrying medium may also be a gas such as helium, argon, or nitrogen. In certain embodiment, use of a carrying medium with a higher viscosity to form a thicker covering over the powder may be desirable.

In certain embodiments, a precursor used to facilitate binding of the powder with the substrate is blended with the powder prior to deposition on the substrate, The precursor may comprise a binding agent, such as a polymer, to hold the powder on the surface of the substrate. The binding agent will generally have some electrical conductivity to avoid diminishing the performance of the deposited layer. in one embodiment, the binding agent is a carbon containing polymer having a low molecular weight. The low molecular weight polymer may have a number average molecular weight of less than about 10,000 to promote adhesion of the nanoparticles to the substrate. Exemplary binding agents include, but are not limited to, polyvinylidene fluoride (PVDF) styrene-butadiene rubber (SBR), carboxymethyl cellulose (CMC), water soluble binders, and combinations thereof. In one embodiment, N-methyl-2-pyrrolidone (NMP) is used as a carrier for the binding agent.

The cathodically active material may be applied by either wet powder application techniques or dry powder application techniques. Exemplary powder application techniques include but are not limited to electrostatic spraying techniques, thermal or flame spraying techniques, and combinations thereof. Other techniques which may be used include sifting techniques, fluidized bed coating techniques, slit coating techniques, roll coating techniques, and combinations thereof, all of which are known to those skilled in the art.

Electrostatic spraying methods may be used to deposit powder over the patterned substrate 810. Electrostatic spraying charges the powder particles and then sprays the powder particles toward the area to be coated, such as the patterned substrate 810, with an opposite and attractive electric charge. Since the charged powders in the spray stream are attracted toward the area to be coated, the electrostatic process helps minimize overspray and waste.

Thermal or flame spraying techniques may also be used to deposit powder over the patterned substrate 810. Thermal spraying techniques are coating processes in which melted (or heated) materials are sprayed onto a surface. The "feedstock" (coating precursor) is heated by electrical (e.g., plasma or arc) or chemical means (e.g., combustion flame). Coating materials available for thermal spraying include metals, alloys, ceramics, plastics and composites. The coating materials are fed in powder form, heated to a molten or semi-molten state and accelerated towards the substrate in the form of micrometer-size and/or nanometer-size particles. Combustion or electrical arc discharge is usually used as the source of energy for thermal spraying. Exemplary thermal spraying techniques and apparatus are described in commonly assigned U.S. Provisional patent application Ser. No. 12/862,244, filed Aug. 24, 2010, to Shang et al., titled IN-SITU DEPOSITION OF BATTERY ACTIVE LITHIUM MATERIALS BY THERMAL SPRAYING, now published as US 2011/0045206, which is herein incorporated by reference in its entirety.

In one embodiment, a layer of electrochemically active material is deposited on a substrate in a thermal spray operation. An electrochemical deposition precursor material comprising particles of electrochemically active materials such as lithium metal oxides, which may be any of the electrochemically active compounds described herein, or a mixture thereof, in a water slurry, is exposed to thermal energy to form a stream of electrochemically active nanocrystals that deposit on the substrate. The slurry may be mixed with a carbon-containing fluid, such as an organic compound comprising oxygen and hydrogen, for example isopropyl alcohol, to form a precursor mixture. Sugars may be dissolved in the water carrying medium to add carbon to the mixture, as described above.

The precursor mixture may comprise an electrochemically active material having the general formula $LiNi_wMn_xCo_yO_z$, wherein w, x, and y are each between about 0.3 and 1.5 and z is between about 1.5 and 2.5. The nanocrystals exit the processing chamber entrained in a stream of hot gas. In one embodiment, the nanocrystals exit the processing chamber at a velocity of between about 10 m/sec and about 600 m/sec., such as about 100 m/sec. the stream forming a jet having a length between about 0.1 and 1.5 m, such as about 1 m. The substrate is generally positioned between about 0.1 and 1.5 m from the processing chamber.

The patterned layer 830 of cathodically active material may have a "first porosity" or "low porosity" of at least 20%, 25%, 30%, or 35% as compared to a solid film formed from the same material. The patterned layer 830 of cathodically active material may have a first porosity or "low porosity" of up to 25%, 30%, 35%, or 40% as compared to a solid film formed from the same material. The first porosity may be between about 20% and about 40% as compared to a solid film formed from the same material.

The patterned layer 830 of cathodically active material may have a "second porosity" or "high porosity" of at least 40%, 45%, 50%, 55%, 60%, 65%, or 70% as compared to a solid film formed from the same material. The patterned layer 830 of cathodically active material may have a second porosity or "high porosity" of up to 45%, 50%, 55%, 60%, 65%, 70%, or 75% as compared to a solid film formed from the same material. The second porosity may be between about 40% and about 70% as compared to a solid film formed from the same material.

The porosity of the as-deposited layer may be controlled by modifying different parameters. Exemplary parameters include the particle size of the cathodically active material, the amount of binder used, and/or the velocity of the cathodically active material if a spray process is used to deposit the cathodically active material.

At block 740, the patterned mask may be removed.

Optionally, at block 750, the as-deposited patterned layer 830 is exposed to a compression process to achieve a desired porosity. The compression process may lead to any of the aforementioned porosities. Exemplary compression processes include calendering processes and stamping processes. The as-deposited patterned layer 830 may be heated during the compression process. The temperature applied during the calendering process may be selected and adjusted depending on the desired final porosity. The pressure applied during the calendering process may be selected and adjusted depending on the desired final porosity.

Figure 8D:
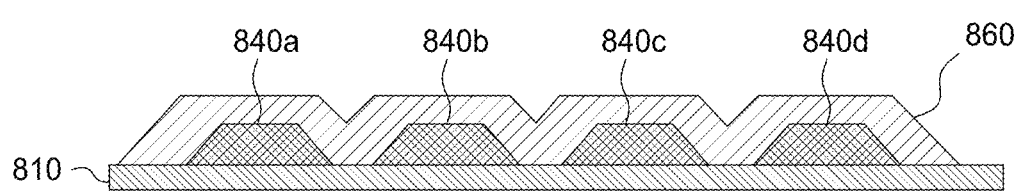
Figure 8E:
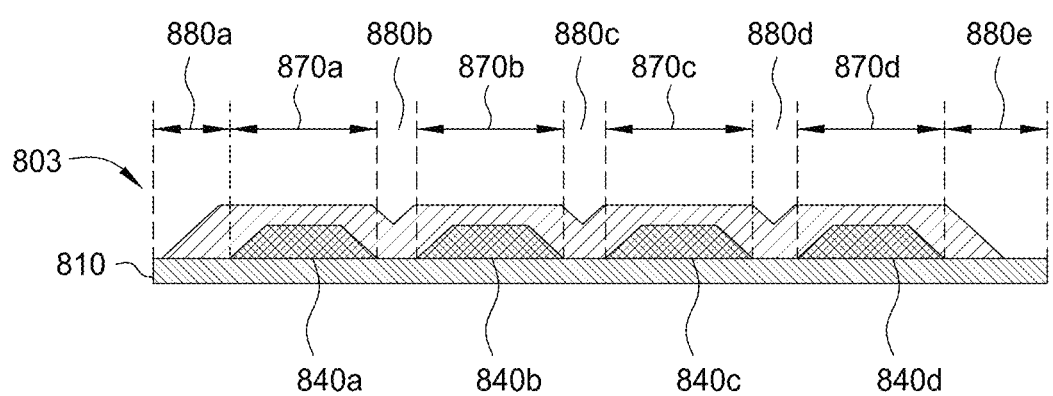

At block 760, additional cathodically active material is applied to the patterned cathodically active material to form a blanket layer 860 over the patterned layer 830. The blanket layer 860 may comprise the same cathodically active material as the patterned layer 830 in block 760. The blanket layer 860 may be deposited using the deposition processes previously described. The blanket layer 860 may have a second porosity greater than the first porosity. The blanket layer 860 may have an average thickness from about 10 µm to about 200 µm. In one embodiment, the blanket layer 860 may have an average thickness between about 50 µm to about 100 µm. As shown in FIG. 8D, the blanket layer 860 may cover the cathodically active material features 840*a-d* and also fill the channel 850 in between the cathodically active material features 840*a-d*. The blanket layer 860 may mimic the topography of the underlying cathodically active material features 840*a-d*.

The blanket layer 860 of cathodically active material may have a "first porosity" or "high porosity" of at least 40%, 45%, 50%, 55%, 60%, 65%, or 70% as compared to a solid film formed from the same material. The blanket layer 860 of cathodically active material may have a first porosity or "high porosity" of up to 45%, 50%, 55%, 60%, 65%, 70%, or 75% as compared to a solid film formed from the same material. The first porosity may be between about 40% and about 70% as compared to a solid film formed from the same material.

In certain embodiments, the blanket layer 860 of cathodically active material may have a "first porosity" or "low porosity" of at least 20%, 25%, 30%, or 35% as compared to a solid film formed from the same material. In certain embodiments, the patterned layer 830 of cathodically active material may have a first porosity or "low porosity" of up to 25%, 30%, 35%, or 40% as compared to a solid film formed from the same material. The first porosity is between about 20% and about 40% as compared to a solid film formed from the same material.

Optionally, at block 770, the as-deposited patterned layer 830 and the overlying blanket layer 860 are compressed to achieve a desired porosity. The layers 830 and 860 may be compressed using the compression processes described in block 770. Compression of the as deposited layers leads to the formation of a lateral porosity gradient having regions of low porosity 870a-870d and regions of high porosity 880a-880e. The areas of blanket material deposited above the cathodically active features are compressed to a greater degree to form the regions of low porosity 870a-870d than the areas of blanket material deposited in the one or more channels 850 which form the regions of high porosity 880a-880e.

The regions of low porosity 870a-870d may have a porosity of at least 20%, 25%, 30%, or 35% and up to 25%, 30%, 35%, or 40% as compared to a solid film formed from the same material. The regions of high porosity 880a-880e may have a porosity of at least at least 40%, 45%, 50%, 55%, 60%, 65%, or 70% and up to up to 45%, 50%, 55%, 60%, 65%, 70%, or 75% as compared to a solid film formed from the same material.

Figure 9A:
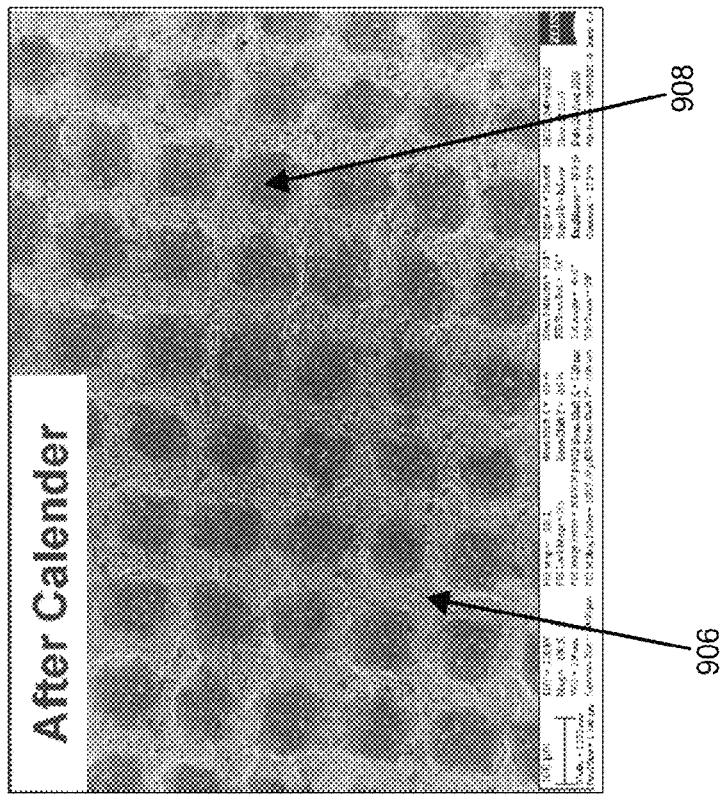
FIG. 9A is an SEM photograph depicting one embodiment of the as-deposited cathodically active material prior to the calendering process.

FIG. 9A is an SEM photograph depicting one embodiment of the as-deposited cathodically active material prior to the calendering process. As shown in FIG. 9A, before the calendering process the thickness variation in the electrode film is visible. The thick areas 902 containing both the patterned material and the overlying blanket material are visible. The thin channels 904 containing only the blanket material are also visible.

Figure 9B:
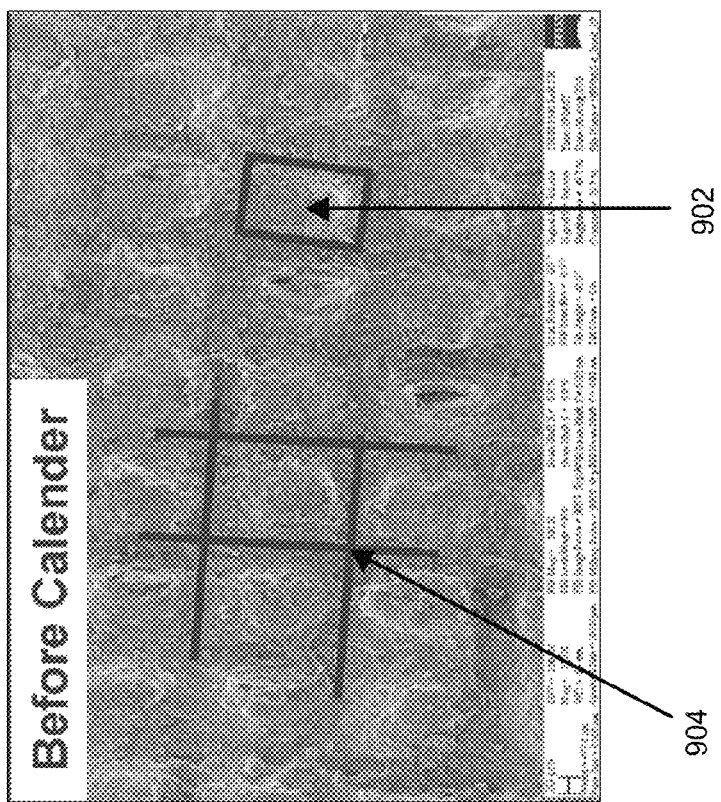
FIG. 9B is an SEM photograph depicting the as-deposited cathodically active material of FIG. 9A after a calendering process.

FIG. 9B is an SEM photograph depicting the as-deposited cathodically active material of FIG. 9A after a calendering process. After the calendering process both the high porosity channels 906 and the low porosity squares 908, formerly the thick areas containing both the patterned material and the overlying material, are visible.

Example

The following prophetic non-limiting example is provided to further illustrate embodiments described herein. However, the example is not intended to be all inclusive and is not intended to limit the scope of the embodiments described herein.

Nickel-manganese-cobalt oxide or "NMC" is mixed with carbon black or acetylene black) and styrene butadiene rubber ("SBR") to form a slurry material comprising 91% by weight NMC, 3% by weight SBR, and 6% by weight carbon black. The slurry is electro-sprayed through the openings of an aluminum wire mesh mask onto an aluminum foil substrate to form a patterned material. As-deposited, the patterned film has an initial porosity of 50% when compared with a solid film formed from the same material. An NMC based slurry is then electro-sprayed over the patterned film to form a blanket film. The blanket film has an initial porosity of about 60%. The patterned film and blanket film are calendered to locally compress and reduce the porosity of select areas of the cathode film. After the calendering process, the regions of blanket NMC material directly above the patterned regions of NMC material have a reduced porosity of about 30% porosity whereas regions of the NMC material deposited between the patterned regions (e.g., material deposited in channels between the discrete patterned regions) maintained porosities similar to the initial porosity of 60%.

Three Dimensional Lateral Variation in Cathode Porosity

Current electrodes for Li-ion batteries are manufactured using a slit coating process to deposit a cathodically active material followed by a slow drying process, and a final calender step to define the porosity of the film. In order to make higher loading batteries, a thicker layer of active material is required, but as the layer gets thicker, it becomes more difficult for the lithium ions to travel through the film, so the overall efficiency of the active material decreases. It is believed that the overall efficiency of the active material can be improved by grading the porosity of the active material. Taken a step further, if high porosity channels are available in the lateral dimension to allow for the fast movement of lithium-ions to the lower parts of the film, then thicker (thus higher loading) electrodes can be fabricated, and could operate quite efficiently.

In certain embodiments, the active material (e.g., nickel-manganese-cobalt oxide or "NMC") is mixed with an electro-conductive material (e.g., carbon black or acetylene black) and a polymeric binder to form a slurry or "paint-like" material. This paint-like material may be electro-sprayed onto a current collector foil to form a blanket cathode film. As-deposited, the blanket cathode film may have a porosity of 45-75% when compared with a solid film formed from the same material. The blanket film is then patterned to locally compress and reduce the porosity of select areas of the cathode film. The blanket film may be patterned using a static press or the patterns can be cut into a set of calender rollers for a continuous process. The pattern may be in the shape of lines or dots. The approximate dimensions of the pattern may be comparable to the film thickness, (e.g., 100 micron size features for a 100 micron thick cathode film). The uncompressed areas of the patterned cathode film will have a porosity of the as-deposited material, whereas the compressed areas may have a porosity of between about 25-45% when compared with a solid film formed from the same material, thus creating a lateral porosity gradient with regions of high porosity and regions of low porosity. The porosity ratios are adjustable depending on the exact target use for the battery. After the patterning process, the active material may be re-sprayed to further thicken and planarize the patterned cathode film. The patterning process may also be performed with a patterned die positioned on each side of a double sided coated current collector to simultaneously process both sides of the current collector.

Figure 10:
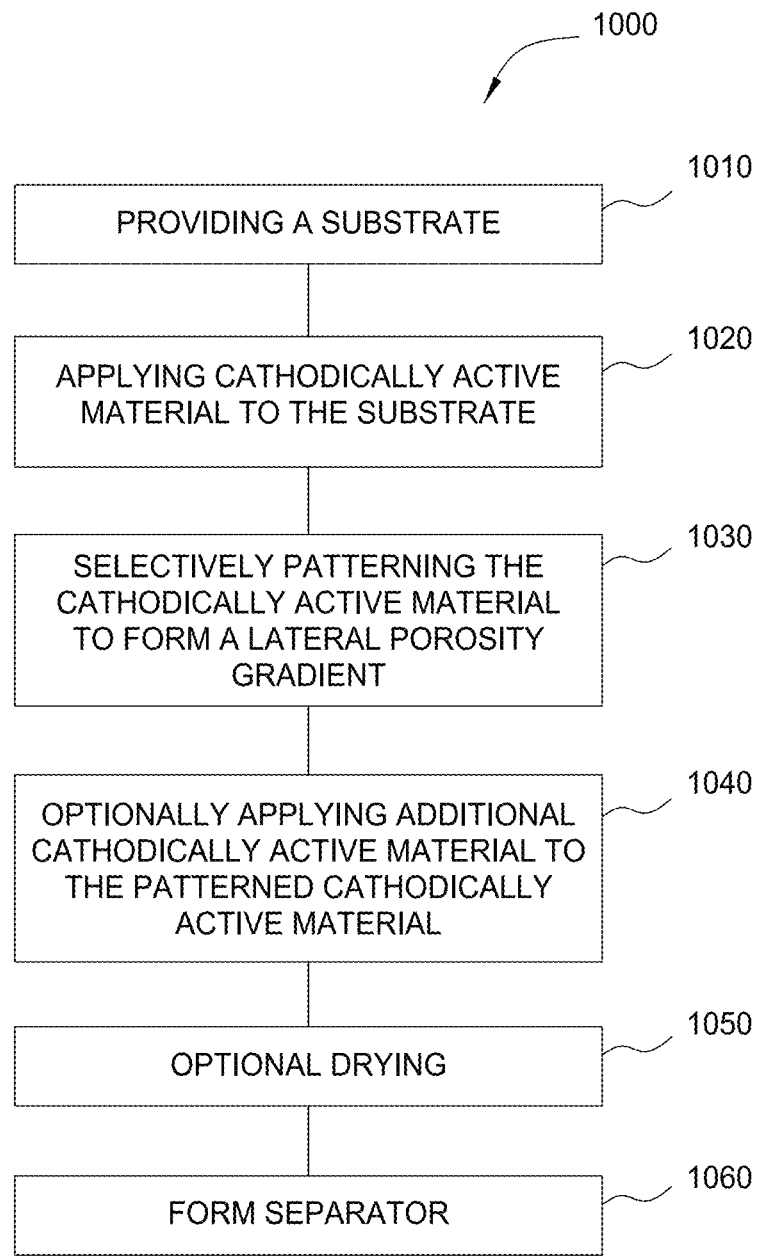
FIG. 10 is a process flow chart summarizing one embodiment of a method for forming an electrode structure according to embodiments described herein.

FIG. 10 is a process flow chart summarizing one embodiment of a method 1000 for forming an electrode structure according to embodiments described herein. The electrode structure comprises a cathode structure 1103 having a lateral porosity gradient. The cathode structure 1103 may be similar to cathode structures 103a, 103b depicted in FIG. 1. FIGS. 11A-11E are schematic cross-sectional views of the electrode at various stages of formation.

Figure 11A:
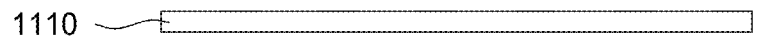
FIGS. 11A-11H are schematic cross-sectional views of an electrode structure at various stages of formation according to embodiments described herein.
Figure 11B:
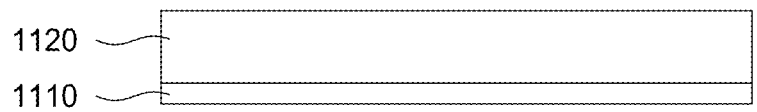

At block 1010, a substrate 1110 is provided. The substrate may be a current collector. The current collector may be similar to current collector 111a, 111b. In FIG. 11A, the substrate 1110 is schematically illustrated prior to the deposition of a cathodically active material 1120. In one embodiment, the substrate 1110 is a conductive substrate (e.g., metallic foil, sheet, or plate). The substrate 1110 may have an insulating coating disposed thereon. In one embodiment, the substrate 1110 may include a relatively thin conductive layer disposed on a host substrate comprising one or more conductive materials, such as a metal, plastic, graphite, polymers, carbon-containing polymer, composites, or other suitable materials. Examples of metals that substrate 1110 may be comprised of include aluminum (Al), copper (Cu), zinc (Zn), nickel (Ni), cobalt (Co), palladium (Pd), platinum (Pt), tin (Sn), ruthenium (Ru), stainless steel, alloys thereof, and combinations thereof. In one embodiment, the substrate 1110 is perforated.

Alternatively, the substrate 1110 may comprise a host substrate that is non-conductive, such as a glass, silicon, and plastic or polymeric substrate that has an electrically conductive layer formed thereon by means known in the art, including physical vapor deposition (PVD), electrochemical plating, electroless plating, and the like. In one embodiment, the substrate 1110 is formed from a flexible host substrate. The flexible host substrate may be a lightweight and inexpensive plastic material, such as polyethylene, polypropylene or other suitable plastic or polymeric material, with a conductive layer formed thereon. In one embodiment, the conductive layer may be between about 10 and 15 microns thick in order to minimize resistive loss. Materials suitable for use as such a flexible substrate include a polyimide (e.g., KAPTON™ by DuPont Corporation), polyethylene terephthalate (PET), polyacrylates, polycarbonate, silicone, epoxy resins, silicone-functionalized epoxy resins, polyester (e.g., MYLAR ™ by E.I. du Pont de Nemours & Co.), APICAL AV manufactured by Kanegaftigi Chemical Industry Company, UPILEX manufactured by UBE Industries, Ltd.; polyethersulfones (PES) manufactured by Sumitomo, a polyetherimide (e.g., ULTEM by General Electric Company), and polyethylene naphthalate (PEN). Alternately, the flexible substrate may be constructed from a relatively thin glass that is reinforced with a polymeric coating.

In certain embodiments, the substrate 1110 may comprise any of the conductive materials previously described including but not limited to aluminum, stainless steel, nickel, copper, and combinations thereof. The substrate 1110 may be in the form of a foil, a film, or a thin plate. In certain embodiments, the substrate 1110 may have a thickness that generally ranges from about 1 to about 200 µm. In certain embodiments, the substrate 1110 may have a thickness that generally ranges from about 5 to about 100 µm. In certain embodiments, the substrate 1110 may have a thickness that ranges from about 10 µm to about 20 µm.

In certain embodiments, the substrate 1110 is patterned to form a three dimensional structure. The three-dimensional structure may be formed using, for example, a nano-imprint lithography process or an embossing process.

In certain embodiments, the substrate 310 comprises a wire mesh structure. The wire mesh structure may be made of a material selected from aluminum and alloys thereof. The wire mesh structure may have a wire diameter between about 0.050 micrometers and about 200 micrometers. The wire mesh structure may have a wire diameter between about 0.050 micrometers and about 200 micrometers. The wire mesh structure may have an opening between about 10 micrometers and about 100 micrometers. As used herein with reference to wire mesh, the term "openings" refers to the distance between two adjacent parallel wires. The wire mesh structure may comprise any materials compatible with process chemistries. Exemplary materials include stainless steel, plain steel, and aluminum. In certain embodiments, it may be desirable to use the wire mesh structure as the three-dimensional cathode structure since it does not require nano-imprinting or etching.

At block 1020, a cathodically active material 1120 is applied to the substrate 1110. The cathodically active material 1120 may be in powder form. The powder form comprising particles of the cathodically active material. Exemplary cathodically active materials include lithium cobalt dioxide ($LiCoO_2$), lithium manganese dioxide ($LiMnO_2$), titanium disulfide ($TiS_2$), $LiNixCo_{1-2x}MnO_2$ (NMC), $LiMn_2O_4$, iron olivine ($LiFePO_4$) and it is variants (such as $LiFe_{1-x}MgPO_4$), $LiMoPO_4$, $LiCoPO_4$, $Li_3V_2(PO_4)_3$, $LiVOPO_4$, $LiMP_2O_7$, $LiFe_{1.5}P_2O_7$, $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, $Na_5V_2(PO_4)_2F_3$, $Li_2FeSiO_4$, $Li_2MnSiO_4$, $Li_2VOSiO_4$, and combinations thereof.

In one embodiment, the particles of the powder are nano-scale particles. The nano-scale particles may have a diameter between about 1 nm and about 100 nm. The particles of the powder may be micro-scale particles. The particles of the powder may include aggregated micro-scale particles. The micro-scale particles may have a diameter between about 2 µm and about 15 µm. The particles generally include the components used to form the second electrolyte containing material 112a, 112b of the cathode structures 103a, 103b. A layer of material formed on the surface of a substrate, which contains the particles of the powder will be referred to below as the as-deposited layer.

In certain embodiments, the cathodically active material 1120 may be combined with a carrying medium prior to application of the cathodically active material 1120. In one example, the carrying medium may be a liquid that is atomized before entering the processing chamber. The carrying medium may also be selected to nucleate around the electrochemical nanoparticles to reduce attachment to the walls of the processing chamber. Suitable liquid carrying media include water and organic liquids such as alcohols or hydrocarbons. The alcohols or hydrocarbons will generally have low viscosity, such as about 10 cP or less at operating temperature, to afford reasonable atomization. In other embodiments, the carrying medium may also be a gas such as helium, argon, or nitrogen. In certain embodiments, use of a carrying medium with a higher viscosity to form a thicker covering over the powder may be desirable.

In certain embodiments, a precursor used to facilitate binding of the powder with the substrate is blended with the powder prior to deposition on the substrate. The precursor may comprise a binding agent, such as a polymer, to hold the powder on the surface of the substrate. The binding agent will generally have some electrical conductivity to avoid diminishing the performance of the deposited layer. In one embodiment, the binding agent is a carbon containing polymer having a low molecular weight. The low molecular weight polymer may have a number average molecular weight of less than about 10,000 to promote adhesion of the nanoparticles to the substrate. Exemplary binding agents include, but are not limited to, polyvinylidene difluoride (PVDF) styrene-butadiene rubber (SBR), carboxymethyl cellulose (CMC), water soluble binders, and combinations thereof. In one embodiment, N-methyl-2-pyrrolidone (NMP) is used as a carrier for the binding agent.

The cathodically active material 1120 may be applied by either wet application techniques or dry powder application techniques. Exemplary powder application techniques include but are not limited to sifting techniques, electrostatic spraying techniques, thermal or flame spraying techniques, fluidized bed coating techniques, slit coating techniques, roll coating techniques, and combinations thereof, all of which are known to those skilled in the art.

Electrostatic spraying methods may be used to deposit powder over the substrate 1110. Electrostatic spraying charges the powder particles and then sprays the powder particles toward the area to be coated, such as the substrate 1110, with an opposite and attractive electric charge. Since the charged powders in the spray stream are attracted toward the area to be coated, the electrostatic process helps minimize overspray and waste.

Fluidized bed coating methods may also be used to deposit powder over the substrate 1110. In fluidized bed systems, air is blown up through a porous bed or screen to suspend the powder thereby forming a fluidized bed. The item to be coated is inserted into the fluidized bed allowing the powder coating particles to stick onto the exposed surfaces. Coating powders in a fluidized bed can also be charged for the application of thicker coatings.

Thermal or flame spraying techniques may also be used to deposit powder over the substrate 1110. Thermal spraying techniques are coating processes in which melted (or heated) materials are sprayed onto a surface. The "feedstock" (coating precursor) is heated by electrical (e.g., plasma or arc) or chemical means (e.g., combustion flame). Coating materials available for thermal spraying include metals, alloys, ceramics, plastics and composites. The coating materials are fed in powder form, heated to a molten or semi-molten state and accelerated towards the substrate in the form of micrometer-size particles. Combustion or electrical arc discharge is usually used as the source of energy for thermal spraying. Exemplary thermal spraying techniques and apparatus are described in commonly assigned United States Provisional Patent Application Ser. No, 12/862,244, filed Aug. 24, 2010, to Shang et al., and titled IN-SITU DEPOSITION OF BATTERY ACTIVE LITHIUM MATERIALS BY THERMAL SPRAYING, which is herein incorporated by reference in its entirety.

In one embodiment, a layer of electrochemically active material is deposited on a substrate in a thermal spray operation. An electrochemical deposition precursor material comprising particles of electrochemically active materials such as lithium metal oxides, which may be any of the electrochemically active compounds described herein, or a mixture thereof, in a water slurry, is exposed to thermal energy to form a stream of electrochemically active nanocrystals that deposit on the substrate. The slurry may be mixed with a carbon-containing fluid, such as an organic compound comprising oxygen and hydrogen, for example isopropyl alcohol, to form a precursor mixture. Sugars may be dissolved in the water carrying medium to add carbon to the mixture, as described above.

As deposited, the cathodically active material 1120 may have a "first porosity" or "high porosity" of at least 40%, 45%, 50%, 55%, 60%, 65%, or 70% as compared to a solid film formed from the same material. In certain embodiments, the cathodically active material may have a first porosity up to 45%, 50%, 55%, 60%, 65%, 70%, or 75% as compared to a solid film formed from the same material. In one embodiment, the first porosity is between about 40% and about 75% as compared to a solid film formed from the same material. The porosity of the as-deposited layer may be controlled by modifying different parameters. Exemplary parameters include the particle size of the cathodically active material, the amount of binder used, and/or the velocity of the cathodically active material if a spray process is used to deposit the cathodically active material.

Figure 11C:
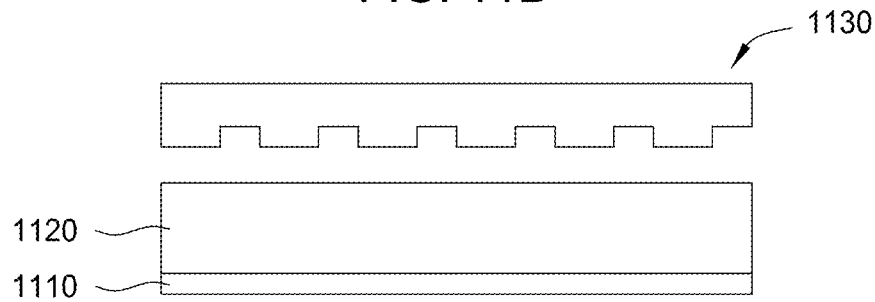
Figure 11D:
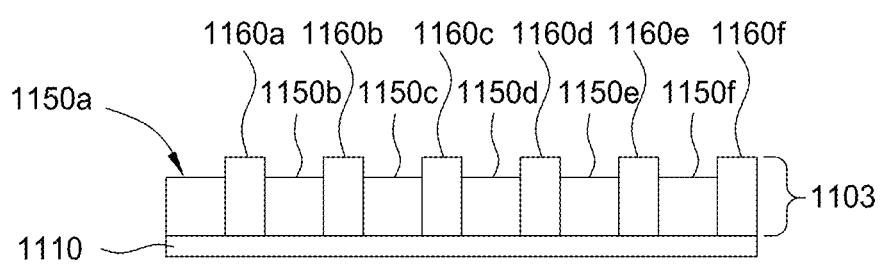

At block 1030, the cathodically active material 1120 is patterned to form the cathode structure 1103. The cathodically active material 1120 is patterned to form a lateral porosity gradient within the as-deposited cathodically active material. The cathodically active material 1120 may be patterned using a compression process. Exemplary compression processes include calendering processes and stamping processes. As shown in FIG. 11C, the cathodically active material 1120 is exposed to a compression member 1130 to form a three-dimensional structure having a lateral porosity gradient. As shown in FIG. 11D, the porosity of the cathodically active material 1120 is decreased in regions where the compression member 1130 contacts the film to form compressed second regions 1150a-1150f having an increased density and decreased porosity relative to the cathodically active material 1120. As a result, the porosity of the cathodically active material 1120 varies laterally across the surface of the substrate 1110.

Figure 11E:
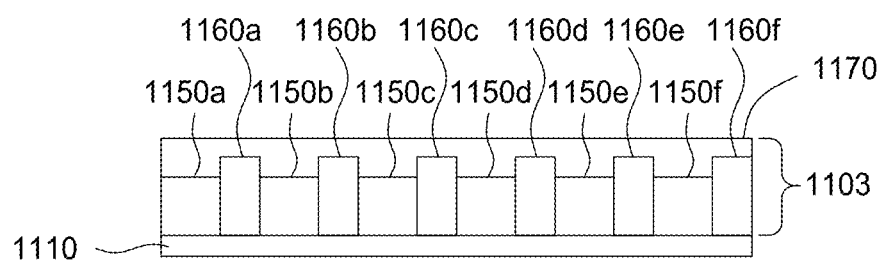

After the compression process, the cathodically active material 1120 is divided into a series of first regions 1160a-1160f which are uncompressed and maintain the first porosity of the cathodically active material 1120 and a series of second regions 1150a-1150f which are compressed and have an increased density. The series of first regions 1160a-1160f may form a continuous region as depicted in FIG. 11G. In certain embodiments, the series of second regions 1150a-1150f form a continuous region. As compressed, the second porosity or "low porosity" of the second regions 1150a-1150f may be at least 20%, 25%, 30%, 35%, or 40% as compared to a solid film formed from the same material. The compressed second regions 1150a-1150f have a second porosity or "low porosity" of up to 25%, 30%, 35%, 40%, or 45% as compared to a solid film formed from the same material. The second porosity may be between about 20% and about 45% as compared to a solid film formed from the same material.

Figure 11F:
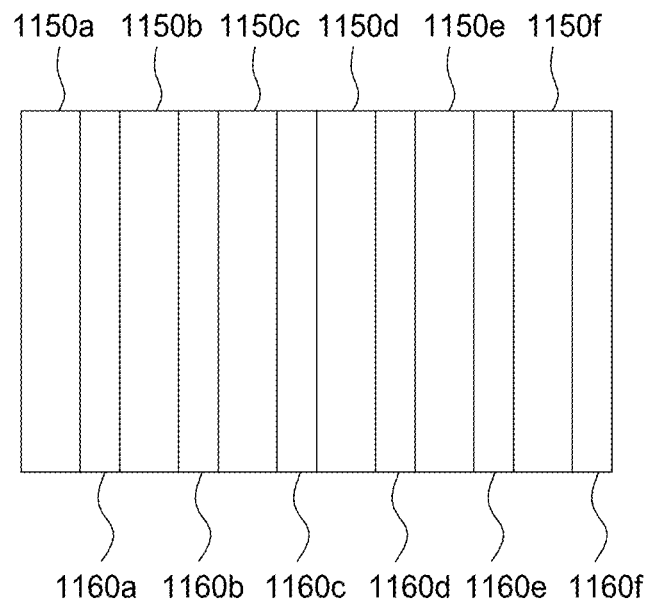
Figure 11G:
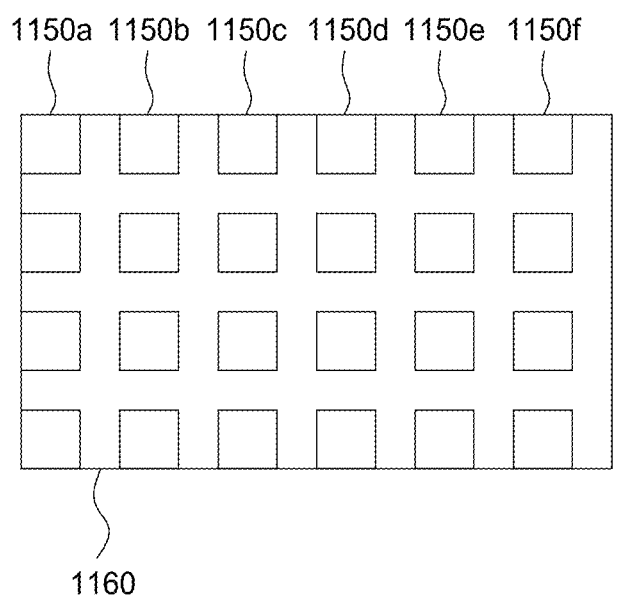

FIG. 11F is a schematic top view of one embodiment of the cathode structure depicted in FIG. 11D formed according to embodiments described herein. The cathode structure depicted in FIG. 11F has a series of lines representing first regions 1160a-1160f having high porosity and second regions 1150a-1150f having low porosity. FIG. 11G is a schematic top view of one embodiment of the cathode structure depicted in FIG. 11D formed according to embodiments described herein. The cathode structure depicted in FIG. 11 G has a checkerboard pattern with second regions 1150a-1150f of low porosity and a first region 1160 of high porosity. As depicted in FIG. 11G, the first region 1160 of high porosity is a continuous region whereas the second regions 1150a-1150f of low porosity are discrete regions. The regions of high porosity may be discrete regions and the regions of low porosity may be a continuous region. It should be understood that the patterns depicted in FIG. 11F and FIG. 11G are only exemplary and any pattern which achieves the desired porosity gradient may be used.

At block 1040, as depicted in FIG. 11E, an optional process of applying additional cathodically active material 1170 to the patterned cathodically active material may be performed. The additional cathodically active material 1170 may be used to planarize the surface of the cathode structure 1103. The additional cathodically active material 1170 may be the same material as the cathodically active material 1120. The additional cathodically active material 1170 may be a different cathodically active material than the cathodically active material 1120. The additional cathodically active material 1170 may be deposited using the same processes as discussed above.

At block 1050, an optional drying process is performed in order to accelerate drying of the cathodically active material in embodiments where wet powder application techniques are used. Drying processes which may be used include, but are not limited to, air drying process, an infrared drying process, or a marangoni drying process. In certain embodiments, the cathodically active material may be dried as it is deposited on the substrate. In certain embodiments, the cathodically active material may be dried during the patterning process by using a heated compression member to pattern the cathodically active material.

The optional drying process may comprise an annealing process. During the annealing process, the substrate may be heated to a temperature in a range from about 100° C. to about 250° C., for example, between about 150° C. and about 190° C. Generally, the substrate may be annealed in an atmosphere containing at least one anneal gas, such as $O_2$, $N_2$, $NH_3$, $N_2H_4$, NO, $N_2O$, or combinations thereof. In one embodiment, the substrate may be annealed in ambient atmosphere. The substrate may be annealed at a pressure from about 5 Torr to about 100 Torr, for example, at about 50 Torr. In certain embodiments, the annealing process serves to drive out moisture from the pore structure.

Figure 11H:
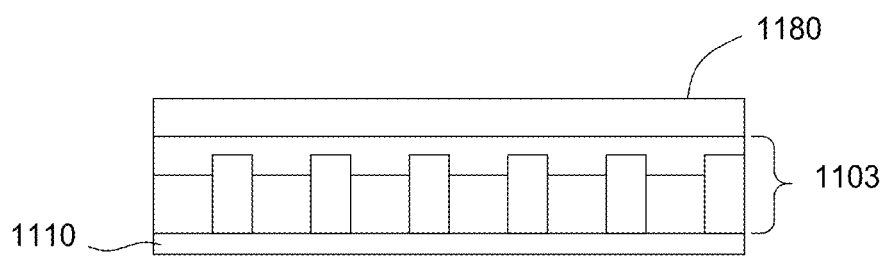

Referring to FIG. 11H, at block 1060, a separator layer 1180 may be formed over the cathode structure 1103. In one embodiment, the separator layer 1180 is a dielectric, porous, fluid-permeable layer that prevents direct electrical contact between the components in the anode structure and the cathode structure. The separator layer 1180 may be deposited directly onto the surface of the cathode structure 1103. Exemplary processes for depositing the separator layer 1180 include electrospraying processes and electrospinning processes. The separator layer 1180 may be a solid polymeric layer. Exemplary materials for forming the separator layer 1180 include polyolefin, polypropylene, polyethylene, and combinations thereof.

Figure 12A:
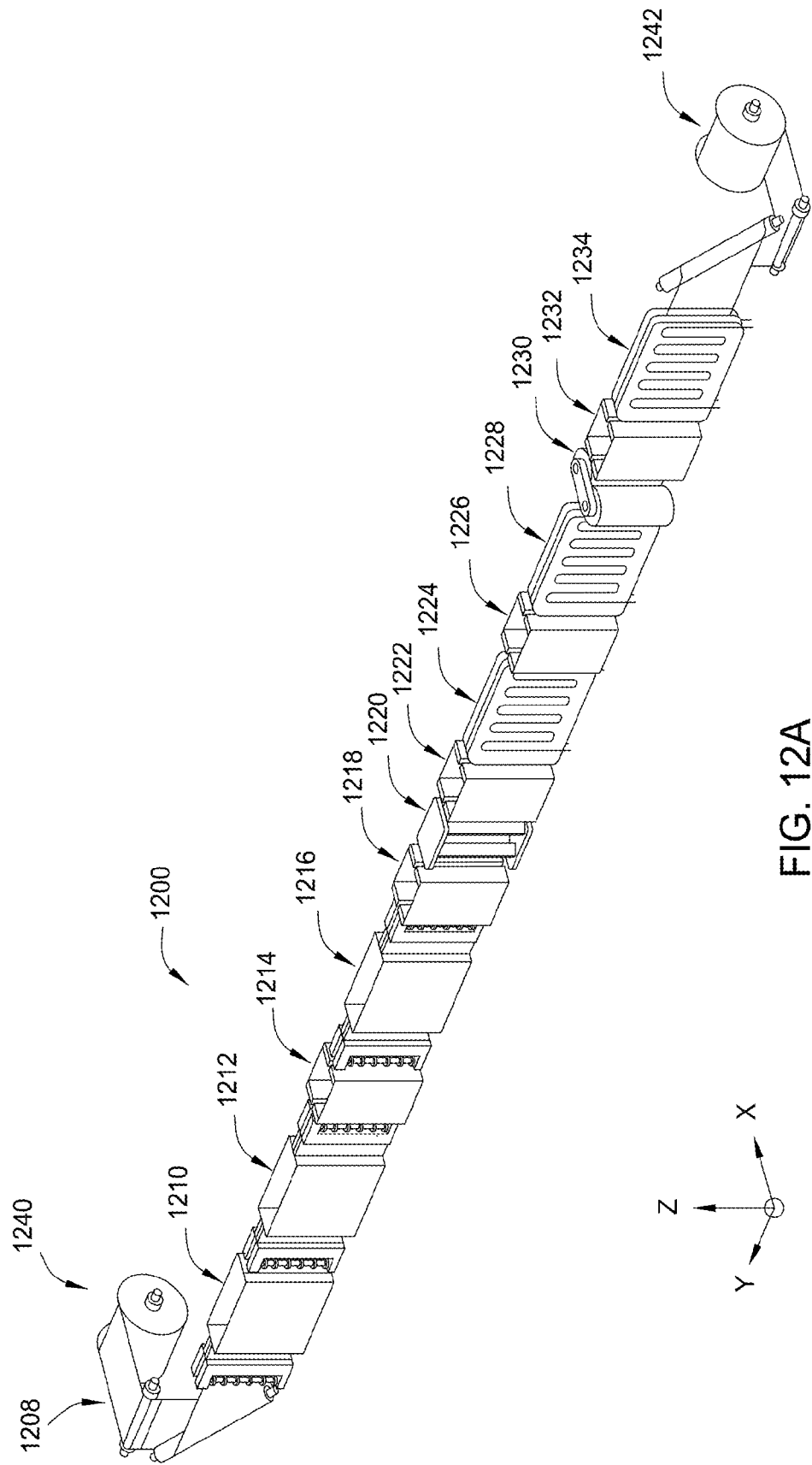
FIG. 12A is a schematic cross-sectional view of one embodiment of a vertical processing system according to embodiments described herein.

FIG. 12A schematically illustrates one embodiment of a vertical processing system 1200 according to embodiments described herein. In certain embodiments, the processing system 1200 comprises a plurality of processing chambers 1210-1234 arranged in a line, each configured to perform one processing step to a flexible conductive substrate 1208. In one embodiment, the processing chambers 1210-1234 are stand alone modular processing chambers wherein each modular processing chamber is structurally separated from the other modular processing chambers. Therefore, each of the stand alone modular processing chambers, can be arranged, rearranged, replaced, or maintained independently without affecting each other. In certain embodiments, the processing chambers 1210-1234 are configured to process both sides of a conductive flexible substrate 1208. Although the processing system 1200 is configured to process a vertically oriented conductive flexible substrate 1208, the processing system 1200 may be configured to process substrates positioned in different orientations, for example, a horizontally oriented conductive flexible substrate.

In one embodiment, the processing system 1200 comprises a first conditioning module 1210 configured to perform a first conditioning process, for example, cleaning at least a portion of the flexible conductive substrate 1208 prior to entering a substrate patterning chamber 1212.

In certain embodiments, the first conditioning module 1210 is configured to heat the flexible conductive substrate 1208 prior to entering the substrate patterning chamber 1212 to increase the plastic flow of the flexible conductive substrate 1208 prior to the microstructure formation process. In certain embodiments, the first conditioning module 1210 is configured to pre-wet or rinse a portion of the flexible conductive substrate 1208.

The substrate patterning chamber 1212 is configured to pattern the flexible conductive substrate 1208 prior to the deposition of active material. In certain embodiments, the substrate patterning chamber 1212 is an embossing chamber. In other embodiments, the substrate patterning chamber 1212 is a nano-imprinting chamber.

In certain embodiments, where the substrate patterning chamber 1212 is an embossing chamber the chamber may be configured to emboss both sides of the conductive flexible substrate 1208. In certain embodiments, multiple embossing chambers may be used. In certain embodiments, each embossing chamber of the multiple embossing chambers is configured to emboss an opposing side of the conductive flexible substrate 1208.

In certain embodiments, the processing system 1200 further comprises a second conditioning chamber 1214 positioned adjacent to the substrate patterning chamber 1212. As one example, the second conditioning chamber 1214 may be configured to perform an oxide removal process in embodiments where the conductive flexible substrate 1208 comprises aluminum, the second conditioning chamber may be configured to perform an aluminum oxide removal process.

In one embodiment, the processing system 1200 further comprises a second substrate patterning chamber 1216 disposed next to the second conditioning chamber 1214. In one embodiment, the second substrate patterning chamber 1216 is configured to perform additional patterning of the flexible conductive substrate 1208.

In one embodiment, the processing system 1200 further comprises a rinse chamber 1218 configured to rinse and remove any residual contaminants from the portion of the vertically oriented conductive flexible substrate 1208 with a rinsing fluid, for example, de-ionized water. In one embodiment, a chamber 1220 comprising an air-knife is positioned adjacent to the rinse chamber 1218.

In one embodiment, the processing system 1200 further comprises an active material deposition chamber 1222. In certain embodiments, the active material deposition chamber 1222 is a first spray coating chamber configured to deposit an anodically or cathodically active powder over the flexible conductive substrate 1208. In one embodiment, the active material deposition chamber 1222 is a spray coating chamber configured to deposit powder over the conductive microstructures formed over the flexible conductive substrate 1208 and to subsequently compress the powder to a desired height. In one embodiment, deposition of the powder and compression of the powder are performed in separate chambers. In certain embodiments, the active material deposition chamber may further comprise a heater for drying the active material after deposition on the flexible conductive substrate 1208. Although discussed as a spray coating chamber, the active material deposition chamber 1222 may be configured to perform any of the aforementioned powder deposition processes.

In one embodiment, the processing system 1200 further comprises a drying chamber 1224 disposed adjacent to the active material deposition chamber 1222 configured to expose the vertically oriented conductive substrate 1208 to an annealing process. In one embodiment, the annealing chamber 1224 is configured to perform a drying process such as a rapid thermal annealing process.

In one embodiment, the processing system 1200 further comprises a second active material deposition chamber 1226 positioned adjacent to the annealing chamber 1224. In one embodiment, the second active material deposition chamber 1226 is a spray coating chamber. Although discussed as a spray coating chamber, the second active material deposition chamber 1226 may be configured to perform any of the aforementioned powder deposition processes. In one embodiment, the second active material deposition chamber 1226 is configured to deposit an additive material such as a binder over the vertically oriented conductive substrate 1208. In certain embodiments where a two pass spray coating process is used, the first active material deposition chamber 1222 may be configured to deposit powder over the vertically oriented conductive substrate 1208 during a first pass using, for example, an electrostatic spraying process, and the second active material deposition chamber 1226 may be configured to deposit powder over the vertically oriented conductive substrate 1208 in a second pass using, for example, an electrospraying or a slit coating process.

In one embodiment, the processing system 1200 further comprises a first drying chamber 1228 disposed adjacent to the second active material deposition chamber 1226 configured to expose the vertically oriented conductive substrate 1208 to a drying process. In one embodiment, the first drying chamber 1228 is configured to perform a drying process such as an air drying process, an infrared drying process, or a marangoni drying process.

In one embodiment, the processing system 1200 further comprises a compression chamber 1230 disposed adjacent to the first drying chamber 1228 configured to expose the vertically oriented conductive substrate 1208 to a calendering process to compress the deposited active material. In one embodiment, the compression chamber 1230 is configured to compress the powder via either a calendering process or a stamping process as previously described.

In one embodiment, the processing system 1200 further comprises a third active material deposition chamber 1232 positioned adjacent to the compression chamber 1230. Although discussed as a spray coating chamber, the third active material deposition chamber 1232 may be configured to perform any of the aforementioned powder deposition processes. In one embodiment, the third active material deposition chamber 1232 is configured to deposit a separator layer over the vertically oriented conductive substrate.

In one embodiment, the processing system 1200 further comprises a second drying chamber 1234 disposed adjacent to the third active material deposition chamber 1232 configured to expose the vertically oriented conductive substrate 1208 to a drying process. In one embodiment, the second drying chamber 1234 is configured to perform a drying process such as an air drying process, an infrared drying process, or a marangoni drying process.

The processing chambers 1210-1234 are generally arranged along a line so that portions of the vertically oriented conductive substrate 1208 can be streamlined through each chamber through feed roll 1240 and take up roll 1242. In one embodiment, each of the processing chambers 1210-1234 has separate feed rolls and take-up rolls. In one embodiment, the feed rolls and take-up rolls may be activated simultaneously during substrate transferring to move each portion of the flexible conductive substrate 1208 one chamber forward.

In certain embodiments where a cathode structure is formed, chamber 1214 may be replaced with a chamber configured to perform aluminum oxide removal. In certain embodiments where a cathode structure is formed, chamber 1216 may be replaced with an aluminum electro-etch chamber.

In certain embodiments, the vertical processing system 1200 further comprises additional processing chambers. The additional processing chambers may comprise one or more processing chambers selected from the group of processing chambers comprising an electrochemical plating chamber, an electroless deposition chamber, a chemical vapor deposition chamber, a plasma enhanced chemical vapor deposition chamber, an atomic layer deposition chamber, a rinse chamber, an anneal chamber, a drying chamber, a spray coating chamber, and combinations thereof. It should also be understood that additional chambers or fewer chambers may be included in the in-line processing system. Further, it should be understood that the process flow depicted in FIG. 12A is only exemplary and that the processing chambers may be rearranged to perform other process flows which occur in different sequences.

It should also be understood that although discussed as a system for processing a vertically oriented substrate, the same processes may be performed on substrates having different orientations, for example, a horizontal orientation. Details of a horizontal processing system that can be used with the embodiments described herein are disclosed in commonly assigned U.S. patent application Ser. No. 12/620,788, titled APPARATUS AND METHOD FOR FORMING 3D NANOSTRUCTURE ELECTRODE FOR ELECTROCHEMICAL BATTERY AND CAPACITOR, to Lopatin et al., filed Nov. 18, 2009, now published as US2010-0126849 of which FIGS. 5A-5C, 6A-6E, 7A-7C, and 8A-8D and text corresponding to the aforementioned figures are incorporated by reference herein. In certain embodiments, the vertically oriented substrate may be slanted relative to a vertical plane. For example, in certain embodiments, the substrate may be slanted from between about 1 degree to about 20 degrees from the vertical plane.

Figure 12B:
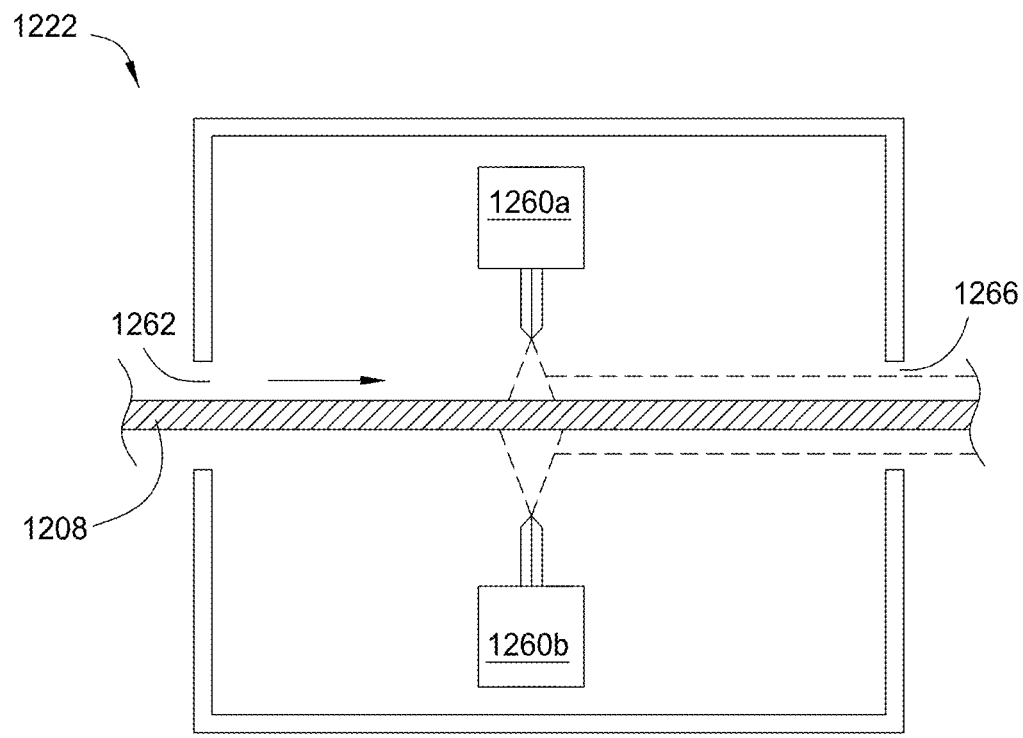
FIG. 12B is a schematic cross-sectional top view of one embodiment of a cathodically active material deposition chamber according to embodiments described herein.

FIG. 12B is a schematic side view of one embodiment of the active material deposition chamber 1222 configured to translate the flexible substrate 1208 through the active material deposition chamber 1222 having opposing powder dispensers 1260a, 1260b disposed across the travel path of the flexible substrate 1208. The active material deposition chamber 1222 may be configured to perform either wet or dry powder application techniques. The active material deposition chamber 1222 may be configured to perform the following powder application techniques including but not limited to sifting techniques, electrostatic spraying techniques, thermal or flame spraying techniques, fluidized bed coating techniques, roll coating techniques, and combinations thereof, all of which are known to those skilled in the art.

A flexible substrate 1208 or substrate enters the chamber through a first opening 1262 and travels between the powder dispensers 1260a, 1260b, which deposits the powder over the conductive microstructure on the flexible substrate 1208. In one embodiment, the powder dispensers 1260a, 1260b each comprise multiple dispensing nozzles oriented across the path of the flexible conductive substrate 1208 to cover the substrate uniformly as it travels between the powder dispensers 1260a, 1260b. The flexible conductive substrate 1208 may moves by virtue of take up rolls and feed rolls (not shown). In certain embodiments, a powder dispenser with multiple nozzles such as the powder dispensers 1260a, 1260b may be configured with all nozzles in a linear configuration, or in any other convenient configuration. To achieve full coverage of the flexible conductive substrate 1208, the dispenser may be translated across the flexible conductive substrate 1208 while spraying activate material, or the flexible conductive substrate 1208 may be translated between the dispensers 1260a, 1260b, or both, according to methods similar to that described above. In certain embodiments, where it is desirable to expose the powder to an electric field, the active material deposition chamber 1222 further comprises an electrical source (not shown), for example, an RF or DC source. The substrate 1208 having been covered with active material, exits the active material deposition chamber 1222 through a second opening 1266 for further processing.

Figure 12C:
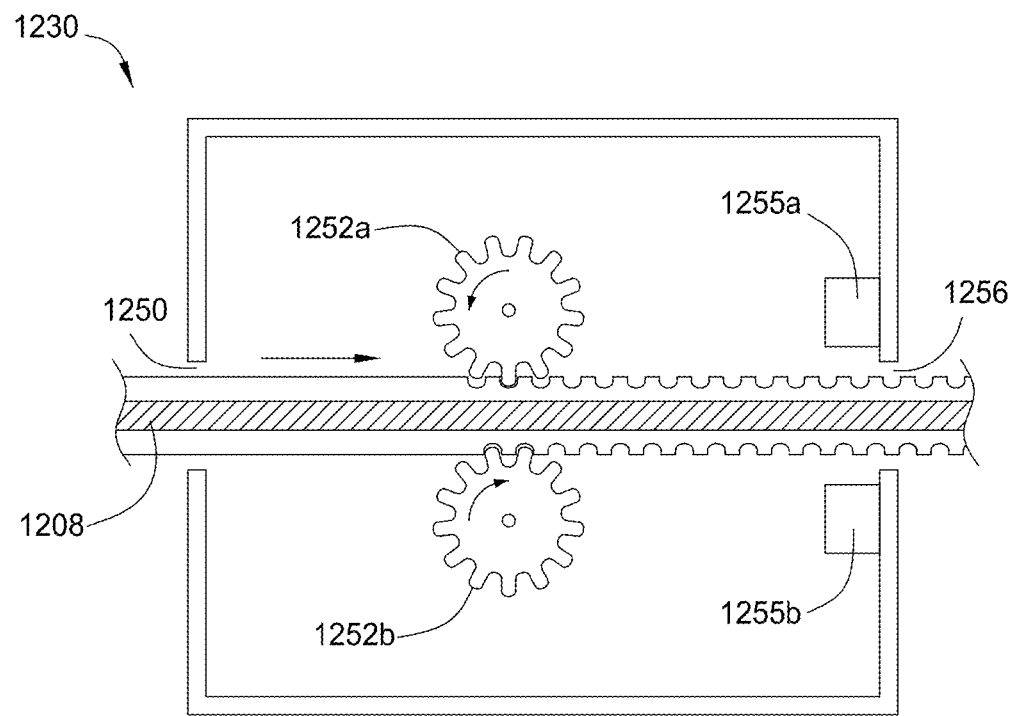
FIG. 12C is a schematic cross-sectional top view of one embodiment of a patterning chamber according to embodiments described herein.

FIG. 12C is a schematic cross-sectional top view of one embodiment of a patterning chamber 1230 according to embodiments described herein. In certain embodiments, after deposition of active material, the flexible conductive substrate 1208 enters the patterning chamber 1230 through a first opening 1250 where the flexible conductive substrate 1208 is embossed or patterned by a pair of compressing members 1252a, 1252b, for example, a pair of cylindrical compressing die using a calender rotary press, in the patterning chamber 1230. The flexible conductive substrate 1208 is drawn through the pair of compressing members 1252a, 1252b to pattern the active material deposited on the flexible conductive substrate 1208. In one embodiment, the flexible conductive substrate 1208 may move by virtue of take up and feed rolls (not shown) and exit the patterning chamber 1230 via a second opening 1256. In one embodiment, the compressing members 1252a, 1252b compress both the active material and the flexible conductive substrate 1208 during the compression process. In certain embodiments, the patterning chamber 1230 further comprises heaters 1255a, 1255b for drying the active material. In certain embodiments, the compressing members 1252a, 1252b further comprise heaters to dry the active material while the active material is being compressed.

In one embodiment, the compressing members 1252a and 1252b comprise two engraved and mated hardened rolls. The compressing members 1252a and 1252b may comprise any materials compatible with the process chemistries. In one embodiment, the compressing members 1252a and 1252b comprise stainless steel. In certain embodiments, the width and diameter of the compressing members 1252a and 1252b may be determined by any of the following: the width of the flexible conductive substrate, the active material thickness, the desired pattern depth, and material tensile strength and hardness.

In certain embodiments each compressing member 1252a and 1252b comprise male and female rotary die portions where the male rotary die portions of each compressing member 1252a and 1252b are offset from each other such that the desired pattern may be formed on opposing sides of the flexible conductive substrate 1208. Although compressing members 1252a and 1252b are depicted as comprising male and female rotary die portions, it should be understood that any know compressing apparatus that forms the desired patterns in the active material may be used with the present embodiments. For example, in certain embodiments, the compressing member 1252a is a male rotary die and the compressing member 1252b is a mated female rotary die. In certain embodiments, the compressing member 1252a comprises a male rotary die and the compressing member 1252b comprises a deformable rotary die. In one embodiment, the deformable rotary die has elastomeric properties. In certain embodiments, the patterning chamber 1230 comprises multiple sets of compressing members. For example, in one embodiment, an additional set (not shown) of rotary die are included in the patterning chamber 1230. The additional set of male and female rotary die may be reversed relative to the initial set of male and female rotary die such that the additional set of rotary die form opposing patterns on the opposite side of the flexible conductive substrate 1208.

It should also be understood that patterns of different shapes may be produced on the flexible conductive substrate 1208 depending on the roller dies used. For example, the patterns may have any desired shape including, square shapes with sharp edges and shapes where the edges are "rounded" (curved without sharp angles) such as semi-circular, conical, and cylindrical shapes.

Figure 12D:
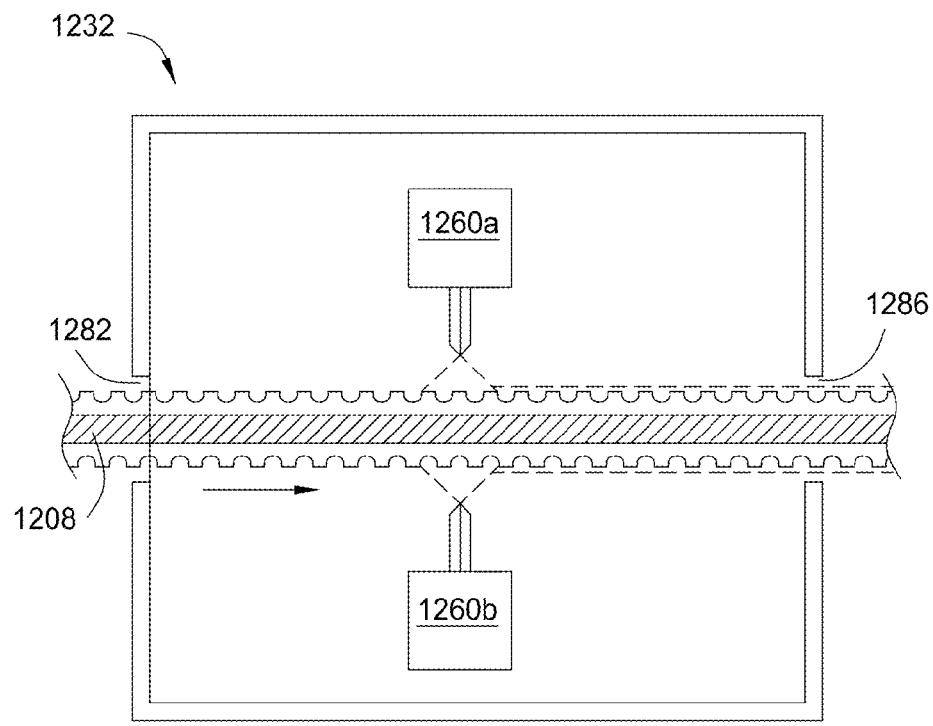
FIG. 12D is a schematic cross-sectional top view of one embodiment of a cathodically active material deposition chamber according to embodiments described herein.

FIG. 12D is a schematic cross-sectional top view of one embodiment of a cathodically active material deposition chamber 1232 according to embodiments described herein. The chamber 1232 is similar to chamber 1222 depicted in FIG. 12B. The flexible conductive substrate 1208 having the patterned cathodically active material deposited thereon enters chamber 232 via opening 1282 is translated through the patterning chamber 1232 where additional cathodically active material is deposited over the patterned cathodically active material and exits the chamber 1232 via second opening 1286.

Figure 12E:
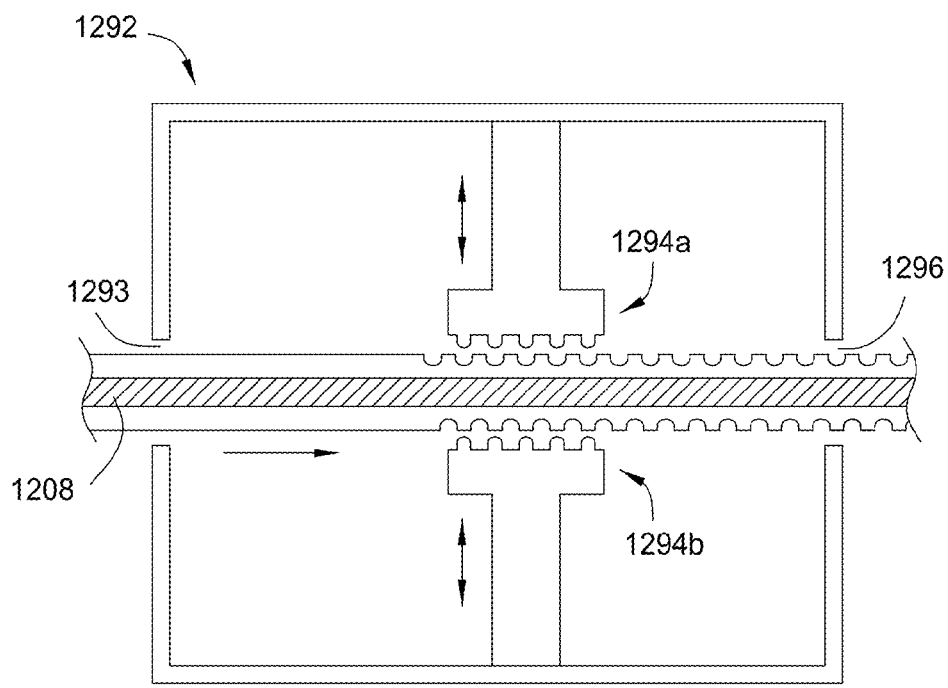
FIG. 12E is a schematic cross-sectional view of another embodiment of a patterning chamber according to embodiments described herein.

FIG. 12E is a schematic cross-sectional view of another embodiment of a patterning chamber 1292 for patterning the cathodically active material according to embodiments described herein. After deposition of the powder from the powder dispensers 1260a, 1260b, the flexible conductive substrate 1208 enters the patterning chamber 1292 through a first opening 1293 where the deposited powder is patterned by a pair of stamping members 1294a, 1294b. The stamping members 1294a, 1294b are configured to contact and compress the as-deposited powder. The flexible conductive substrate 1208 may move by virtue of take up and feed rolls (not shown) and exits the patterning chamber 1292 via second opening 1296.

Example

The following prophetic non-limiting example is provided to further illustrate embodiments described herein. However, the example is not intended to be all inclusive and is not intended to limit the scope of the embodiments described herein.

Nickel-manganese-cobalt oxide or "NMC" is mixed with carbon black or acetylene black) and styrene butadiene rubber ("SBR") to form a slurry material comprising 91% by weight NMC, 3% by weight SBR, and 6% by weight carbon black. The slurry is electro-sprayed onto an aluminum current collector foil to form a blanket cathode film. As-deposited, the blanket cathode film has a porosity of 60% when compared with a solid film formed from the same material. The blanket film is then patterned to locally compress and reduce the porosity of select areas of the cathode film. The blanket film is patterned using a set of patterned calender rollers. The formed pattern may be in the shape of a checkerboard as depicted in FIG. 11G. The uncompressed areas of the patterned cathode film will have a porosity of the as-deposited material, whereas the compressed areas have a porosity of about 30% when compared with a solid film formed from the same material, thus creating a lateral porosity gradient with regions of high porosity and regions of low porosity.

Spray-On Organic/Inorganic Separator

Figure 13:
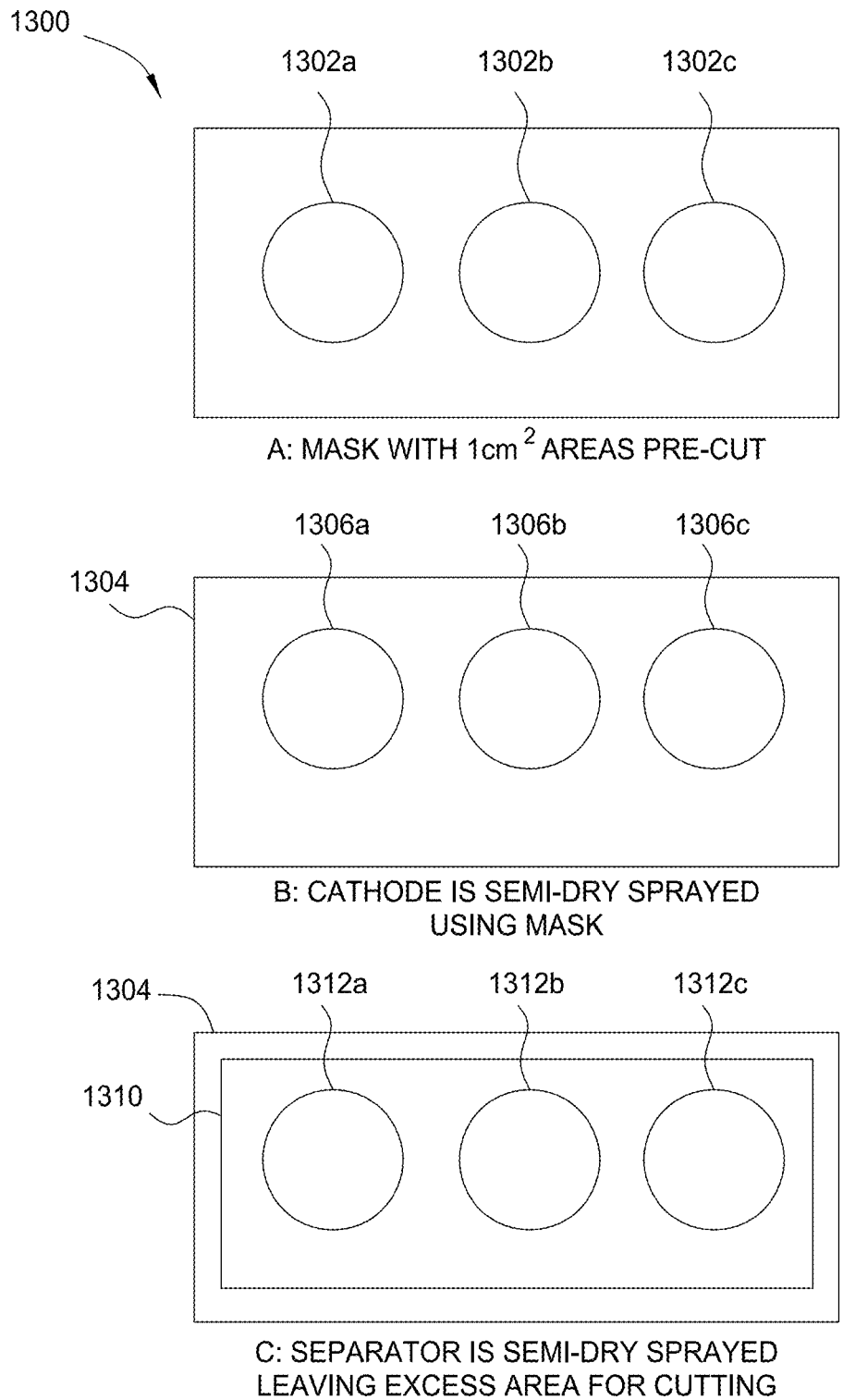
FIG. 13 illustrates a process for depositing a separator onto an electrode according to embodiments described herein.

FIG. 13 illustrates a process for depositing a separator onto an electrode according to embodiments described herein. To demonstrate that a semi-dry sprayed separator works, a coin cell was made using a 30 μm semi-dry sprayed polyvinyl alcohol ("PVA") (10 wt % solution) separator (onto a 74 μm baseline cathode). Initial observations indicated that the electrolyte was able to completely wet the separator and the electrode layer underneath. However, the cell shorted during the first cycle due to the edge of the electrode being exposed as the PVA was sprayed over the cathode.

To overcome this limitation, masks were used to spray individual 1 cm$^2$ areas of the cathode layer with sufficient space around to deposit excess separator material. Then, after the separator was sprayed over the 1 cm$^2$ electrode, cutting areas >1 cm$^2$ ensured that there were no exposed areas of the cathode, see. FIG. 13. It is believed that this process will be useful when incorporating the separator module in the full assembly line for the battery.

In this approach, the desired electrode is deposited on the current collector using masks. One exemplary process involves a 1 cm$^2$ circular electrode. At block A of FIG. 13 a mask 1300 with 1 cm$^2$ holes 1302a-c is cut. At block B of FIG. 13, processes for the deposition of the electrode including doctor blade, spraying or any viable method for electrode deposition are used to spray the active material using the pre-cut mask onto a current collector 1304. Sufficient space is left between the desired electrode areas 1306a-c for individual electrodes to be cut later. The separator material 1310 is then deposited directly over the electrode areas 1306a-c, the edges of the electrode areas 1306a-c and the current collector 1304 to form separator covered electrodes 1312a-1312c at block C of FIG. 13. Methods for the direct fabrication of separators include electrospinning, spraying, powder-coating, dip-coating, doctor blading or any other viable method. Materials include polymers, inorganics or composite of polymers and inorganics. Lastly, the electrode and with the integrated separator assembly can be cut at this point or the other electrode can be directly deposited over this assembly then cut.

A coin cell was made using the process described in FIG. 13. The thickness of the semi-dry sprayed PVA separator was 28 μm (onto a 52 μm baseline cathode). There were no exposed edges. However, the cell also shorted during the first cycle. Currently, indications are that the pores may be too large from semi-dry spraying polymer separators but further testing is in progress to make definitely conclusions. It may be desirable to semi-dry spray an inorganic-organic layer and couple with a fibrous electrospun layer. The electrospun layer will provide the necessary pore size (see below) while the inorganic layer will provide mechanical strength.

While the foregoing is directed to embodiments of the invention, other and further embodiments of the invention may be devised without departing from the basic scope thereof.

What is claimed is:

1. A method for forming a graded cathode structure, comprising:
    forming a patterned layer of cathodically active material on a conductive metallic current collector by spraying the cathodically active material through openings of a patterned mask positioned above the conductive metallic current collector, wherein the patterned layer comprises a plurality of cathodically active features having one or more channels disposed therebetween;
    forming a blanket layer of the cathodically active material over the patterned layer of cathodically active material;
    compressing the as-deposited patterned layer and blanket layer to form a plurality of first regions comprising the plurality of cathodically active features with the cathodically active material of the blanket layer deposited thereon and one or more second regions comprising the cathodically active material of the blanket layer deposited in the one or more channels disposed between the cathodically active features, wherein the plurality of first regions has an average first porosity and the one or more second regions has an average second porosity that is greater than the average first porosity; and
    depositing a separator layer directly on the compressed as-deposited patterned layer and blanket layer, wherein the separator layer is a dielectric, porous, fluid-permeable layer.

2. The method of claim 1, wherein the plurality of first regions and the one or more second regions form a lateral porosity gradient relative to a surface of the conductive metallic current collector.

3. The method of claim 2, wherein forming a blanket layer comprises spraying the cathodically active material over the patterned layer.

4. The method of claim 3, wherein the patterned mask comprises a wire mesh structure with wires having a diameter between about 50 micrometers and 100 micrometers and the wire mesh structure has openings between about 5 micrometers and about 200 micrometers.

5. The method of claim 1, wherein compressing the as-deposited patterned layer comprises calendaring the as-deposited patterned layer and blanket layer.

6. The method of claim 1, wherein the average first porosity is between about 20% and about 35% as compared to a solid film formed from the same material and the average second porosity is between about 40% and about 70% as compared to a solid film formed from the same material.

7. The method of claim 1, wherein the conductive metallic current collector comprises aluminum and the first cathodically active material and the second cathodically active material are $LiNi_xCo_{1-2x}MnO_2$.

8. The method of claim 1, wherein the one or more channels expose a surface of the conductive metallic current collector.

9. The method of claim 1, wherein the conductive metallic current collector consists of a material selected from the group consisting of: aluminum, stainless steel, nickel, copper, and combinations thereof.

10. The method of claim 9, wherein the conductive metallic current collector is in the form of a foil.

11. The method of claim 1, further comprising heating the as-deposited patterned layer and blanket layer while compressing the as-deposited patterned layer and blanket layer.

12. The method of claim 1, wherein the separator layer is deposited by an electrospinning process or an electrospraying process.

* * * * *

UNITED STATES PATENT AND TRADEMARK OFFICE
CERTIFICATE OF CORRECTION

PATENT NO. : 8,927,068 B2
APPLICATION NO. : 13/532616
DATED : January 6, 2015
INVENTOR(S) : Brown et al.

It is certified that error appears in the above-identified patent and that said Letters Patent is hereby corrected as shown below:

In the Specification

In Detailed Description:

Column 6, Line 43, please delete "in" and insert --In-- therefor;

Column 6, Line 48, please delete "in" and insert --In-- therefor;

Column 6, Line 54, please delete "(e,g," and insert --(e.g.,-- therefor;

Column 8, Line 35, please insert --,-- after (PVDF);

Column 8, Line 38, please delete "carder" and insert --carrier-- therefor;

Column 13, Line 14, please delete "El." and insert --E.I.-- therefor;

Column 14, Line 54, please delete "in" and insert --In-- therefor;

Column 14, Line 60, please insert --,-- after (PVDF);

Column 20, Line 42, please delete "difluoride" and insert --fluoride-- therefor;

Column 20, Line 42, please insert --,-- after (PVDF);

In Claims:

Column 30, Claim 5, Line 19, please delete "calendaring" and insert --calendering-- therefor.

Signed and Sealed this
Sixteenth Day of June, 2015

Michelle K. Lee
*Director of the United States Patent and Trademark Office*